United States Patent
Seo

(10) Patent No.: US 9,467,993 B2
(45) Date of Patent: Oct. 11, 2016

(54) METHOD FOR TRANSMITTING AND RECEIVING DOWNLINK CONTROL CHANNELS IN WIRELESS COMMUNICATION SYSTEMS, AND APPARATUS FOR SAME

(71) Applicant: LG ELECTRONICS INC., Seoul (KR)

(72) Inventor: Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 14/404,422

(22) PCT Filed: May 9, 2013

(86) PCT No.: PCT/KR2013/004084
§ 371 (c)(1),
(2) Date: Nov. 26, 2014

(87) PCT Pub. No.: WO2013/180405
PCT Pub. Date: Dec. 5, 2013

(65) Prior Publication Data
US 2015/0139104 A1    May 21, 2015

Related U.S. Application Data

(60) Provisional application No. 61/652,335, filed on May 29, 2012, provisional application No. 61/652,336, filed on May 29, 2012, provisional application No. 61/654,940, filed on Jun. 3, 2012, provisional application No. 61/680,263, filed on Aug. 6, 2012.

(51) Int. Cl.
*H04W 72/04* (2009.01)
*H04L 5/00* (2006.01)

(52) U.S. Cl.
CPC .......... *H04W 72/042* (2013.01); *H04L 5/0053* (2013.01); *H04L 5/0023* (2013.01)

(58) Field of Classification Search
None
See application file for complete search history.

(56) References Cited

U.S. PATENT DOCUMENTS

2013/0194931 A1*  8/2013  Lee ................... H04L 5/0053
370/241

(Continued)

FOREIGN PATENT DOCUMENTS

WO     WO 2012/041467 A1    4/2012

OTHER PUBLICATIONS

Intel Corporation, "Analysis of ePDCCH ICIC", 3GPP TSG RAN WG1 Meeting #68bis, Jeju, Korea, Mar. 26-30, 2012, R1-121535, 4 pages.
LG Electronics, "Discussion on PDSCH mapping in presence of ePDCCH", 3GPP TSG RAN WG1 Meeting #69, Prague, Czech Republic, May 21-25, 2012, R1-122312, pp. 1-3.

(Continued)

*Primary Examiner* — Diane Lo
(74) *Attorney, Agent, or Firm* — Birch, Stewart, Kolasch & Birch, LLP

(57) ABSTRACT

The present invention relates to a method for receiving a downlink signal by a terminal from a base station in a wireless communication system. In particular, the method includes the steps of: receiving an enhanced physical downlink control channel (EPDCCH) for the terminal from the base station; selecting a first EPDCCH physical resource block (PRB) pair or a second EPDCCH PRB pair on the basis of the effective size of a resource block group (RBG) allocated to the terminal and/or the system bandwidth; and receiving a physical downlink shared channel (PDSCH) on the basis of the EPDCCH form among the remaining PRB pairs excluding the selected EPDCCH PRB from among PRB pairs included in the RBG.

14 Claims, 25 Drawing Sheets

(56) References Cited

U.S. PATENT DOCUMENTS

| | | | |
|---|---|---|---|
| 2013/0194950 A1* | 8/2013 | Haghighat | H04W 72/1289 370/252 |
| 2013/0272214 A1* | 10/2013 | Zhu | H04W 28/02 370/329 |
| 2013/0294361 A1* | 11/2013 | Chen | H04L 5/0053 370/329 |
| 2013/0315159 A1* | 11/2013 | Xia | H04W 72/042 370/329 |

OTHER PUBLICATIONS

NTT Docomo, "Mapping Design for E-PDCCH in Rel-11", 3GPP TSG RAN WG1 Meeting #68, Dresden, Germany, Feb. 6-10, 2012, R1-120411, pp. 1-7.

Panasonic, "Type 0 and type 2 PDSCH assignment on resources including ePDCCH allocation", 3GPP TSG RAN WG1 Meeting #69, Prague, Czech Republic, May 21-25, 2012, R1-122205, pp. 1-3.

* cited by examiner

FIG. 2
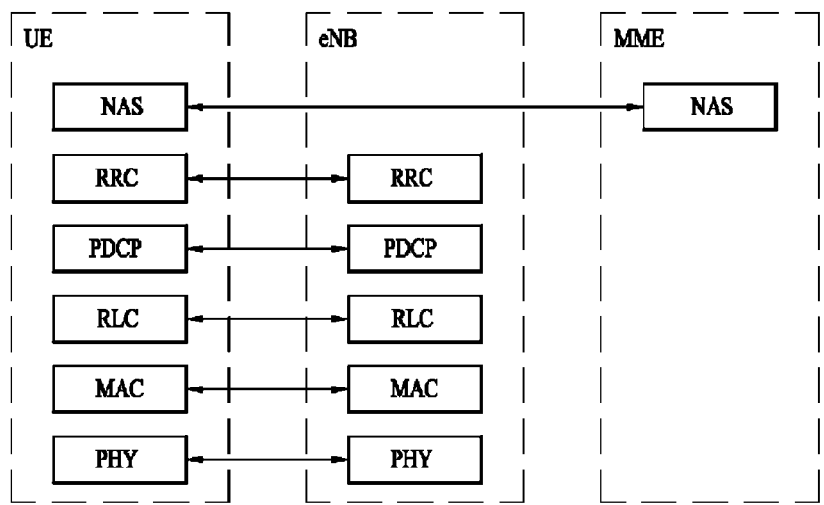
(a) Control-plane protocol stack
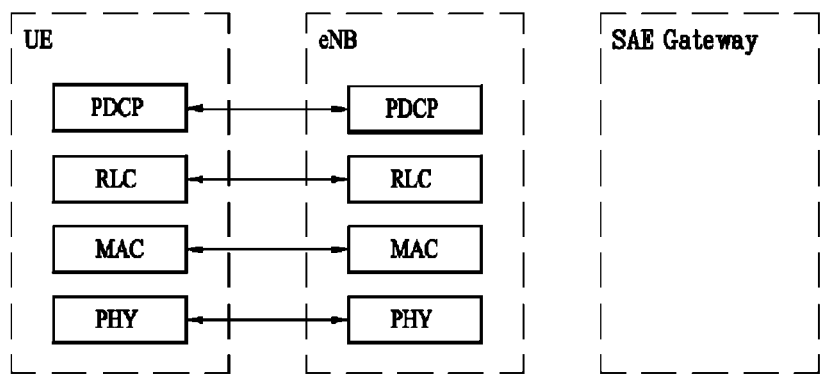
(b) User-plane protocol stack FIG. 5
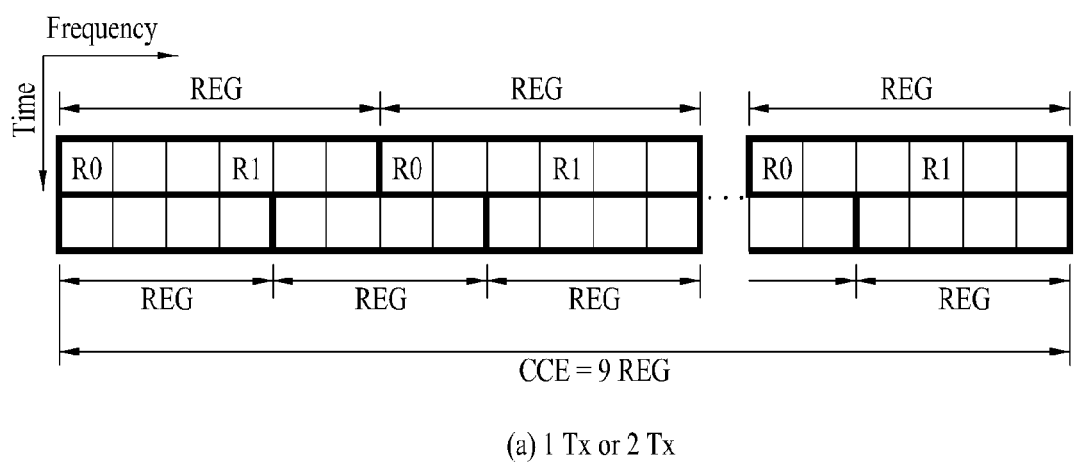
(a) 1 Tx or 2 Tx
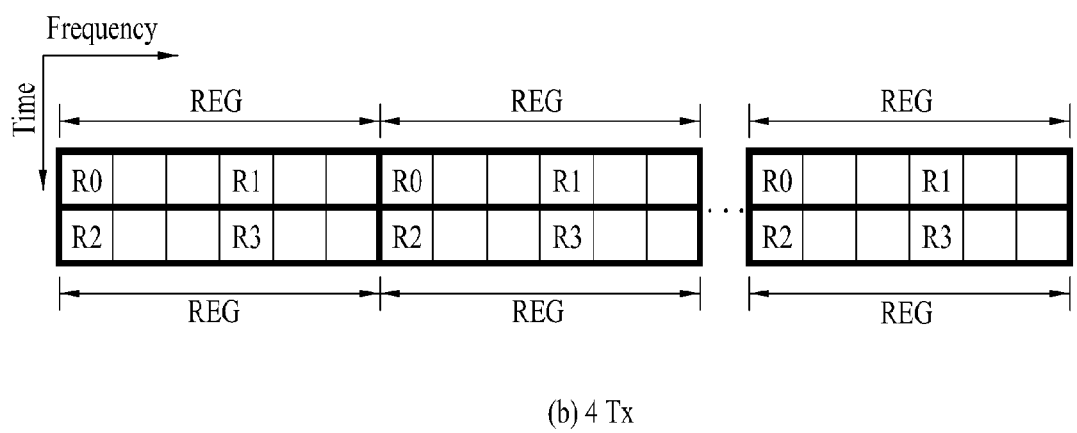
(b) 4 Tx

METHOD FOR TRANSMITTING AND RECEIVING DOWNLINK CONTROL CHANNELS IN WIRELESS COMMUNICATION SYSTEMS, AND APPARATUS FOR SAME

CROSS REFERENCE TO RELATED APPLICATIONS

This application is the National Phase of PCT International Application No. PCT/KR2013/004084, filed on May 9, 2013, which claims priority under 35 U.S.C. 119(e) to U.S. Provisional Application Nos. 61/652,335, filed on May 29, 2012, 61/652,336, filed on May 29, 2012, 61/654,940, filed on Jun. 3, 2012 and 61/680,263, filed on Aug. 6, 2012, all of which are hereby expressly incorporated by reference into the present application.

TECHNICAL FIELD

The present invention relates to a wireless communication system and, more specifically, to a method for transmitting and receiving a downlink control channel in a wireless communication system and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

The present invention presents a method for transmitting and receiving a downlink control channel in a wireless communication system and an apparatus therefor on the basis of the aforementioned discussion.

Technical Solution

In an aspect of the present invention, a method for receiving, by a user equipment (UE), a downlink signal from an eNB in a wireless communication system includes: receiving an enhanced physical downlink control channel (EPDCCH) for the UE from the eNB; selecting one of a first EPDCCH physical resource block (PRB) pair and a second EPDCCH PRB pair on the basis of at least one of an effective size of a resource block group (RBG) allocated to the UE and a system bandwidth; and receiving a physical downlink shared channel (PDSCH) on the basis of the EPDCCH through PRB pairs other than the selected EPDCCH PRB pair from among PRB pairs included in the RBG.

The first EPDCCH PRB pair may be a PRB pair through which the EPDCCH is received, from among the PRB pairs included in the effective resource block group, and the second EPDCCH PRB pair includes a PRB pair through which the EPDCCH is received and a PRB pair through which an EPDCCH for another UE is transmitted, from among the PRB pairs included in the effective resource block group.

The method may further include receiving information on the PRB pair through which the EPDCCH for the other UE is transmitted, from the eNB through a higher layer. The method may further include: receiving information on candidate PRB pairs through which the EPDCCH for the other UE is transmitted, from the eNB through a higher layer; and receiving information on a PRB pair through which the EPDCCH is actually transmitted from among the candidate PRB pairs, from the eNB through a physical layer.

The selecting of one of the first EPDCCH PRB pair and the second EPDCCH PRB pair may include selecting the first EPDCCH PRB pair when the system bandwidth is less than a threshold value and selecting the second EPDCCH PRB pair when the system bandwidth is greater than or equal to the threshold value.

The effective size may be determined on the basis of the number of available resource elements for the EPDCCH. The effective size may be determined on the basis of the number of basic units constituting the EPDCCH, the basic units being defined in a single PRB pair.

In another aspect of the present invention, provided herein is a UE in a wireless communication system, including: a radio communication module configured to transmit/receive signals to/from an eNB; and a processor configured to process the signals, wherein, when an EPDCCH for the UE is received from the eNB, the processor is configured to select one of a first EPDCCH PRB pair and a second EPDCCH PRB pair on the basis of at least one of an effective size of an RBG allocated to the UE and a system bandwidth and to control the radio communication module to receive a PDSCH on the basis of the EPDCCH through PRB pairs other than the selected EPDCCH PRB pair from among PRB pairs included in the RBG.

Advantageous Effects

According to embodiments of the present invention, it is possible to efficiently transmit and receive a downlink control channel between a base station and a terminal in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 illustrates control-plane and user-plane structures in a radio interface protocol conforming to a 3GPP radio access network standard between a UE and an E-UTRAN;

FIG. 5 illustrates resource units used to configure a downlink control channel in LTE;

BEST MODE

Figure 1:
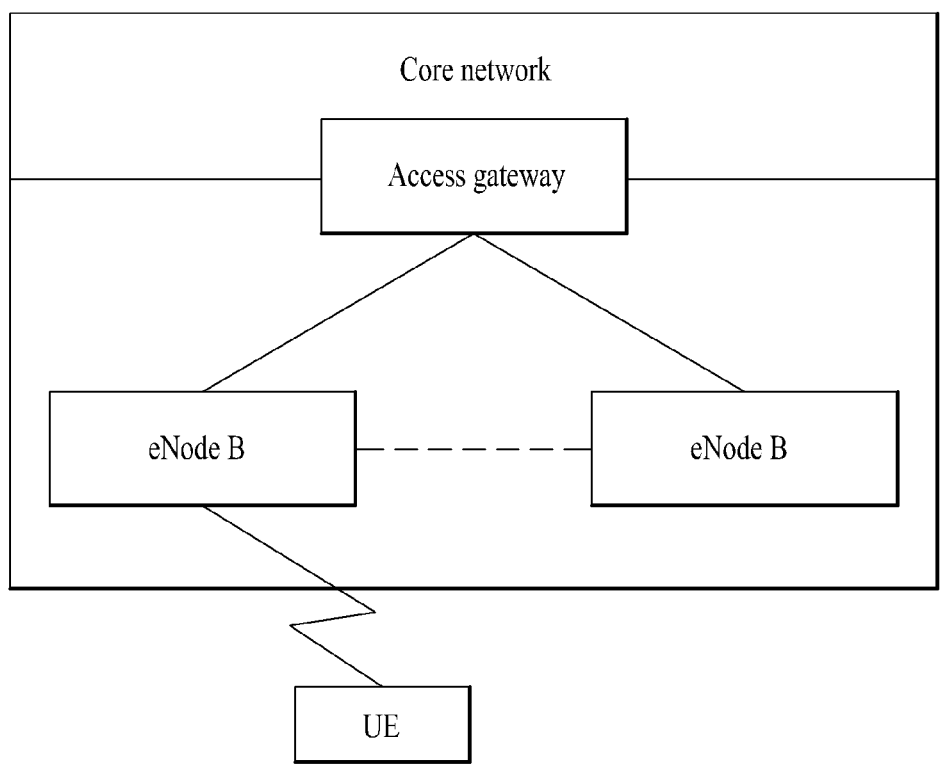
FIG. 1 illustrates a configuration of an E-UMTS network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an evolved Node B (eNB or eNode B) is set to one of bandwidths of 1.4, 3, 5, 10, 15, and 20 Mhz and provides a DL or UL service to a plurality of UEs. Different cells may be set to different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
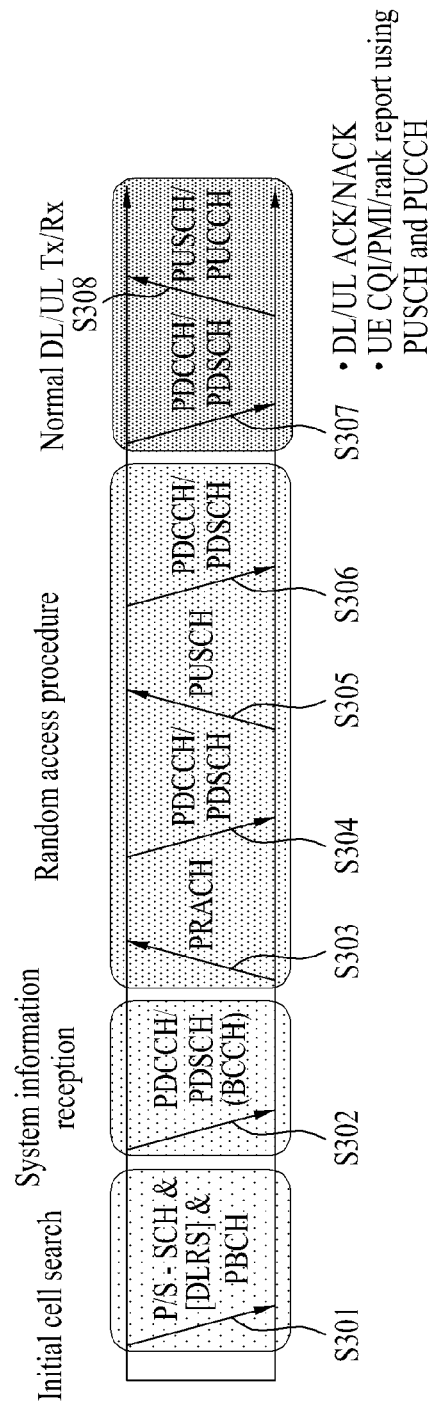
FIG. 3 illustrates physical channels used in a 3GPP system and a general signal transmission method using the physical channels.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
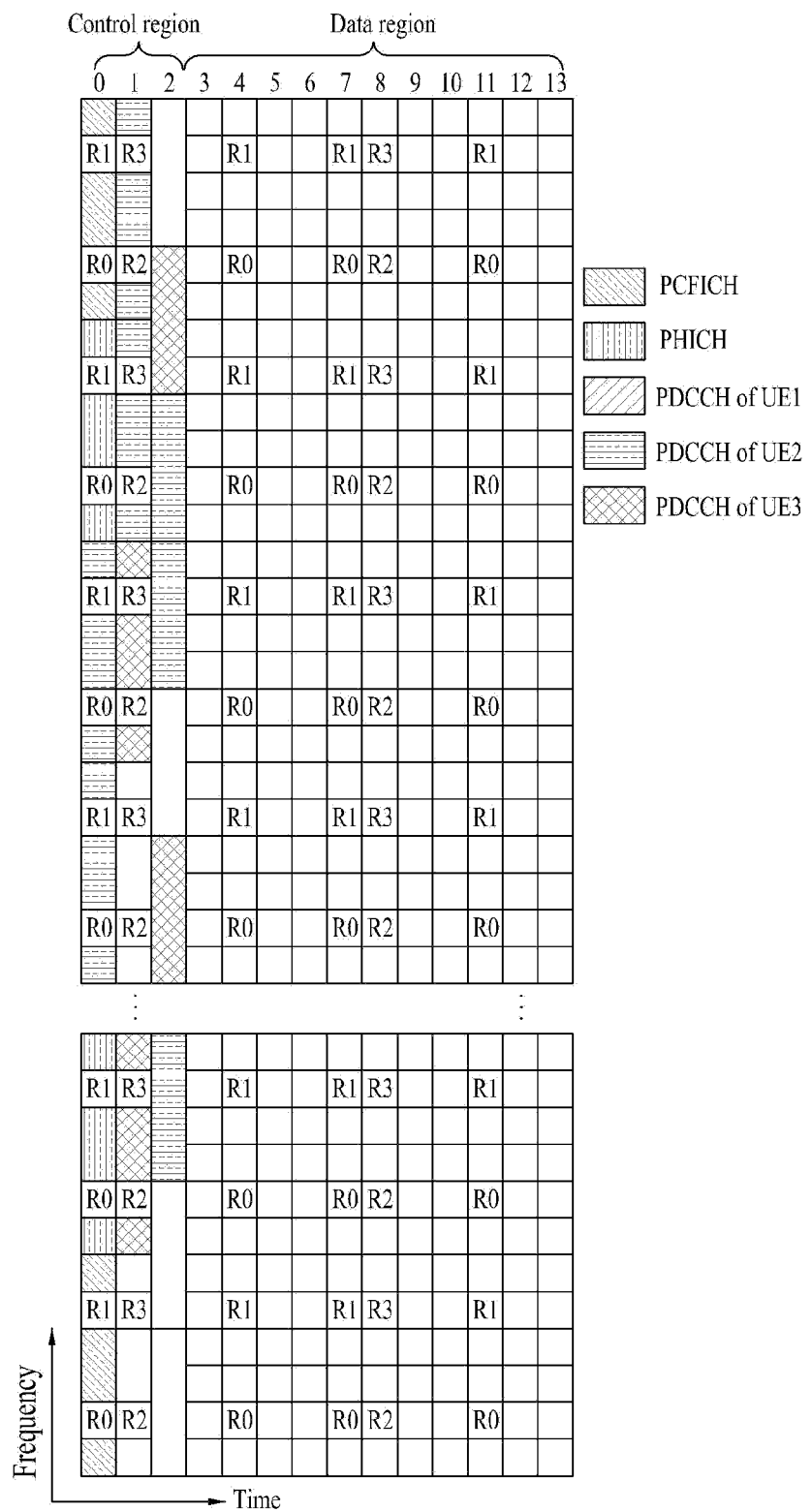
FIG. 4 illustrates a structure of a downlink radio frame used in LTE.

FIG. 4 illustrates exemplary control channels included in a control region of a subframe in a DL radio frame.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates REs used for configuring a DL control channel in the LTE system. Specifically, FIG. 5(*a*) illustrates REs of a DL control channel in the case of 1 or 2 Tx antennas in an eNB and FIG. 5(*b*) illustrates REs of a DL control channel in the case of 4 Tx antennas in an eNB. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 6. A PCFICH and a PHICH include 4 REGs and 3 REGs, respectively. A PDCCH is configured in units of a Control Channel Element (CCE), each CCE including 9 REGs.

To determine whether a PDCCH including L CCEs is transmitted to a UE, the UE is configured to monitor M(L) (≥L) CCEs that are arranged contiguously or in a predetermined rule. L that the UE should consider for PDCCH reception may be a plural value. CCE sets that the UE should monitor to receive a PDCCH are referred to as a search space. For example, the LTE system defines search spaces as illustrated in [Table 1].

TABLE 1

| | Search space $S_k^{(L)}$ | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In [Table 1], L is a CCE aggregation level, that is, the number of CCEs in a PDCCH, Sk(L) is a search space with CCE aggregation level L, and M(L) is the number of candidate PDCCHs to be monitored in the search space with CCE aggregation level L.

Search spaces are classified into a UE-specific search space accessible only to a specific UE and a common search space accessible to all UEs within a cell. A UE monitors common search spaces with CCE aggregation levels 4 and 8 and UE-specific search spaces with CCE aggregation levels 1, 2, 4, and 8. A common search space and a UE-specific search space may overlap with each other.

For each CCE aggregation level, the position of the first CCE (a CCE having the smallest index) of a PDCCH search space allocated to a UE changes in every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency area of the control region of a subframe. As a control channel is configured in units of a CCE but interleaved in units of an REG, a frequency diversity gain and an interference randomization gain may be maximized.

A description will be given of a method of designating a position of a PDCCH candidate in a search space on the basis of the aforementioned description.

It is assumed that the number of CCEs configured in a predetermined subframe k is defined as $N_{CCE,k}$ and indexes of the CCEs are 0 to $N_{CCE,k}-1$. In this case, the position of a PDCCH candidate m=0, . . . , $M^{(L)}-1$ of a corresponding aggregation level L in a search space $S_k^{(L)}$ (L∈{1, 2, 4, 8}) is defined by Expression 1 in the 3GPP standard document.

$$L\{(Y_k+m') \bmod \lfloor N_{CCE,k}/L \rfloor\}+i \qquad \text{[Expression 1]}$$

In Expression 1, m' is set as m'=m in the case of common search space. When the CIF is not defined even in the case of UE specific search space, that is, when cross carrier scheduling is not applied, m' is set as m'=m. Conversely, when the CIF is defined in the case of UE-specific search space, that is, when cross carrier scheduling is applied, m' is defined as m'=m+$M^{(L)} \cdot n_{CI}$. Here, $n_{CI}$ denotes a CIF value.

In the case of common search space, $Y_k$ is set to 0. In the case of UE-specific search space, on the contrary, $Y_k$ may be defined by a hashing function as represented by Expression 2.

$$Y_k=(A \cdot Y_{k-1}) \bmod D \qquad \text{[Expression 2]}$$

In Expression 2, A=39827 and D=65537. In addition, $k=\lfloor n_s/2 \rfloor$ and $n_s$ indicates a slot index in one radio frame. $Y_{-1}=n_{RNTI}\neq 0$ wherein $n_{RNTI}$ denotes a UE identifier.

Figure 6:
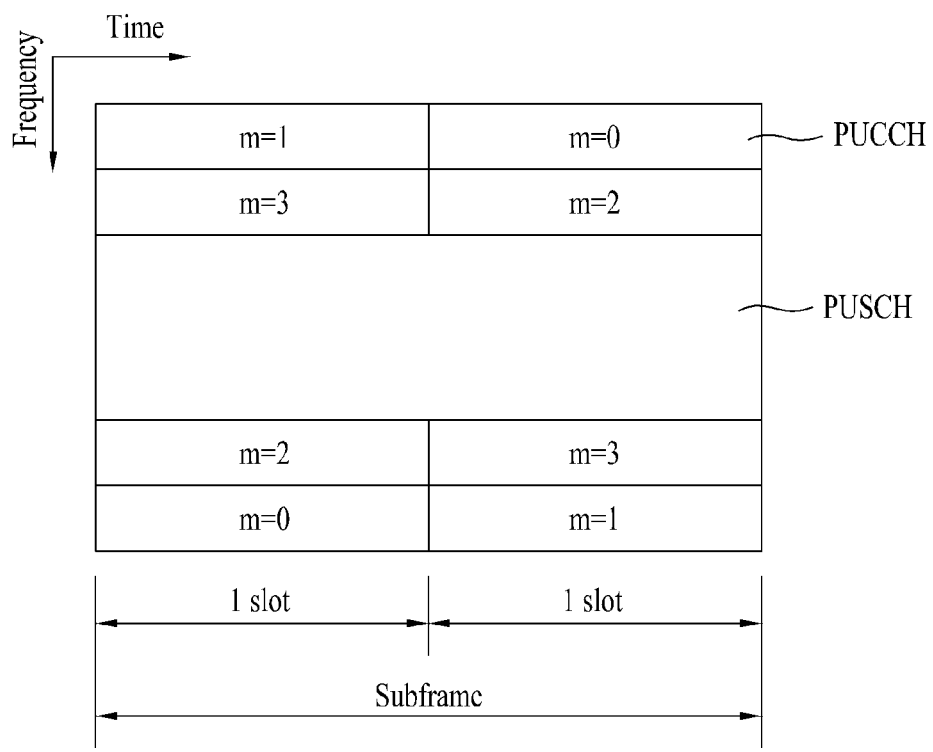
FIG. 6 illustrates a structure of an uplink subframe used in LTE.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
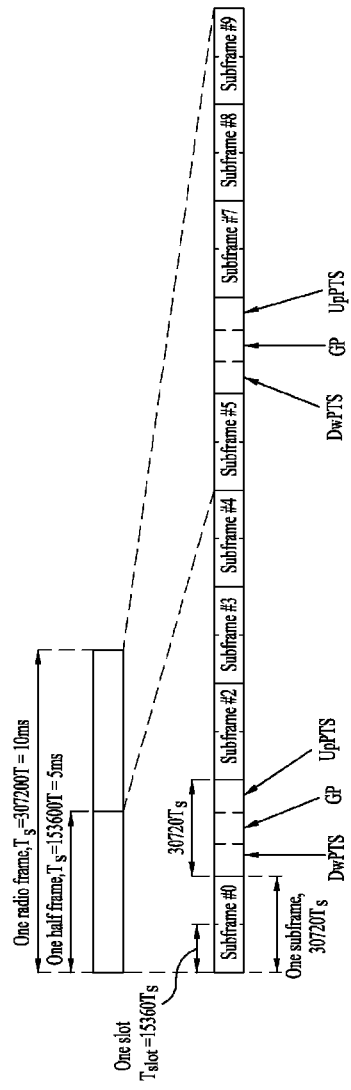
FIG. 7 illustrates a radio frame structure in an LTE TDD (Time Division Duplex) system.

FIG. 7 is a diagram for an example of a structure of a radio frame in LTE TDD system. In LTE TDD system, a radio frame includes two half frames. Each of the half frames includes 4 normal subframes including 2 slots, respectively and a special subframe including DwPTS (downlink pilot time slot), GP (guard period) and UpPTS (uplink pilot time slot).

Among the special subframe, the DwPTS is used for initial cell search in a user equipment, synchronization or channel estimation. The UpPTS is used for channel estimation in a base station and uplink transmission synchronization of the user equipment. In particular, the DwPTS is used for DL transmission and the UpPTS is used for UL transmission. In particular, the UpPTS is utilized to transmit a PRACH preamble or an SRS. The guard period is a period for eliminating interference generated in uplink due to multi-path delay of a downlink signal between uplink and downlink.

Regarding the special subframe, configuration of the special subframe is defined by a current 3GPP standard document as Table 2 in the following. Referring to Table 2, in case of $T_s=1/(15000\times 2048)$, it indicates the DwPTS and the UpPTS and a remaining region is configured as the guard period.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In the LTE TDD system, an uplink/downlink (UL/DL) configuration is shown in Table 3 below.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3 above, D denotes a downlink subframe, U denotes an uplink subframe and S denotes the special subframe. Table 3 above shows a downlink-to-uplink switch-point periodicity in the UL/DL configuration in each system.

Due to emergence and proliferation of various devices requiring Machine-to-Machine (M2M) communication and a large amount of data, the amount of required data over a cellular network is increasing very fast in a current wireless communication environment. To satisfy the high data amount requirement, communication technology is being developed to carrier aggregation that enables efficient use of more frequency bands, MIMO that increases a data capacity in a limited frequency, Coordinated Multi-Point (CoMP), etc. Furthermore, the communication environment is evolving toward highly populated nodes accessible to users. A system having highly populated nodes may increase system performance through cooperation between nodes. This technology has very excellent performance, relative to a non-cooperative case where each node serves as an independent Base Station (BS), Advanced BS (ABS), Node B, eNB, Access Point (AP), or the like.

Figure 8:
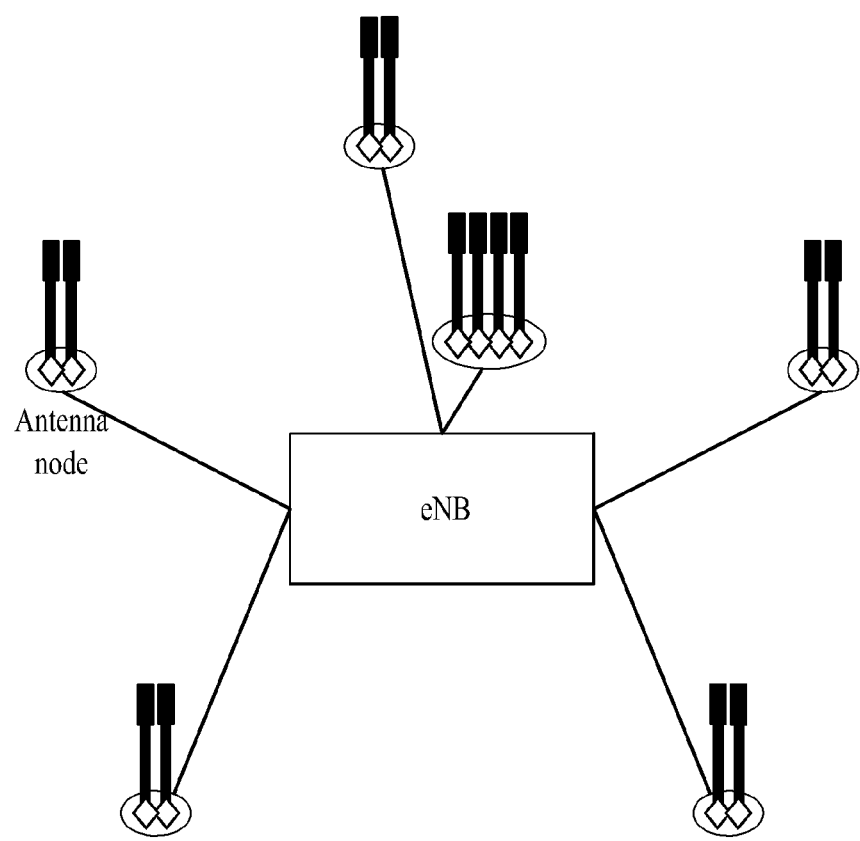
FIG. 8 illustrates a multi-node system from among next-generation communication systems.

FIG. 8 illustrates a configuration of a multi-node system as a future-generation communication system.

Referring to FIG. 8, if all nodes collectively operate as an antenna set of a cell, with their transmission and reception under control of a controller, this system may be regarded as a Distributed Multi-Node System (DMNS) forming one cell. The individual nodes may be allocated node IDs or may operate as antennas of the cell without node IDs. However, if the nodes have different cell IDs, this system may be regarded as a multi-cellular system. If multiple cells are overlaid according to their coverage, this is called a multi-tier network.

Meanwhile, a node may be any of a Node B, an eNB, a Picocell eNB (PeNB), a Home eNB (HeNB), a Remote Radio Head (RRH), a relay, a distributed antenna, etc. At least one antenna is installed in one node. A node is also called a transmission point. While a node refers to an antenna group with antennas apart from each other by a predetermined distance or farther, the present invention may be implemented even though a node is defined as an antenna group irrespective of the distance between antennas.

With the introduction of the aforementioned multi-node system and relay node, various communication schemes can be applied and channel quality can be improved. However, introduction of a new control channel is needed to apply the above-described MIMO and CoMP to a multi-node environment. Accordingly, introduction of an enhanced PDCCH (EPDCCH) is under discussion. The EPDCCH is allocated to a data region (referred to as a PDSCH region hereinafter) instead of a control region (referred to as a PDCCH region hereinafter). Consequently, control information about a node can be transmitted to each UE through the EPDCCH and thus a problem caused by insufficient PDCCH regions can be solved. For reference, the EPDCCH is not provided to legacy UEs and can be received by LTE-A UEs only. In addition, the EPDCCH is transmitted and received on the basis of a DM-RS (or CSI-RS) instead of a CRS which is a cell specific reference signal.

Figure 9:
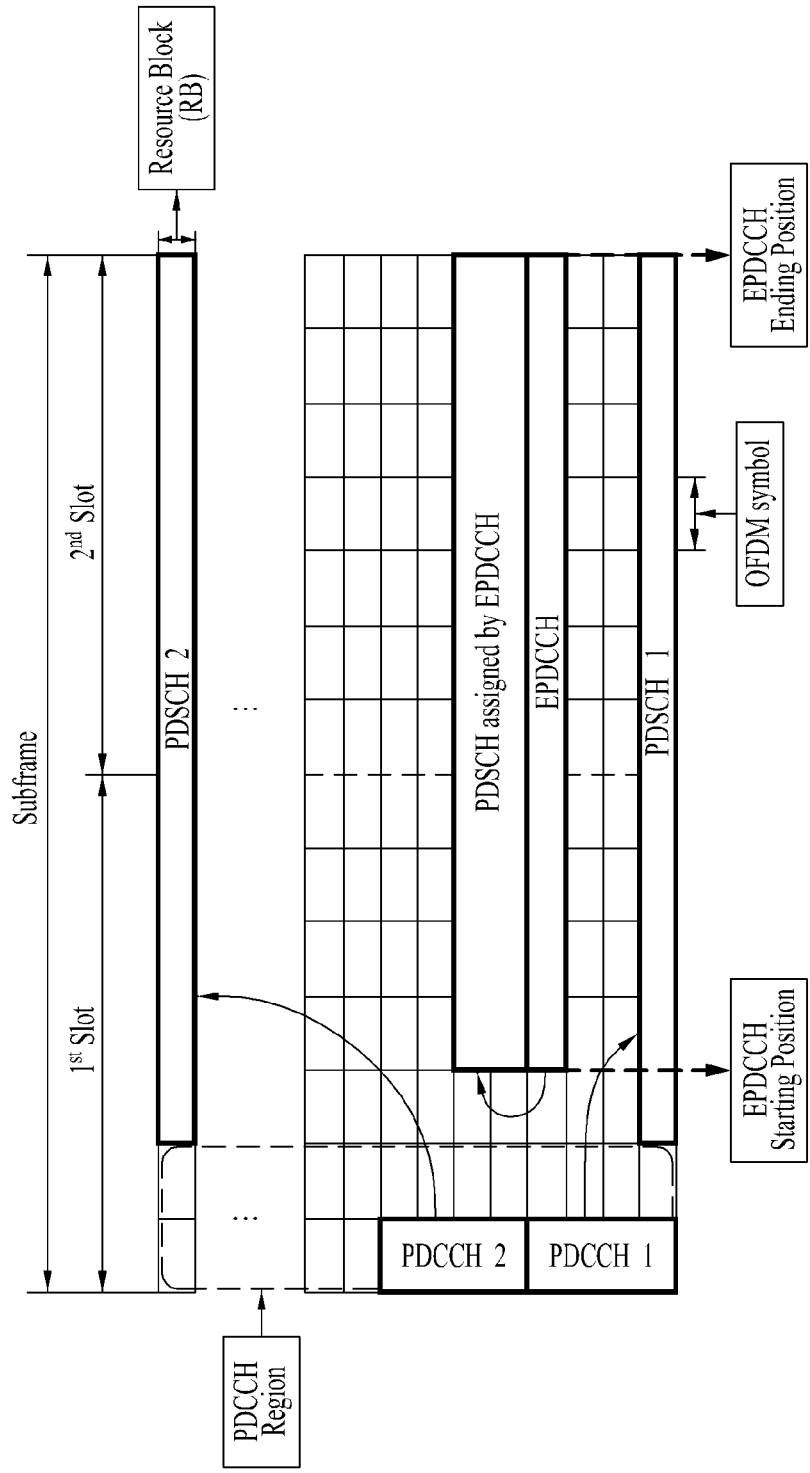
FIG. 9 illustrates an EPDCCH and a PDSCH scheduled by the EPDCCH.

FIG. 9 illustrates an EPDCCH and a PDSCH scheduled by the EPDCCH.

Referring to FIG. 9, PDCCH1 and PDCCH 2 respectively schedule PDSCH 1 and PDSCH 2 and the EPDCCH schedules another PDSCH. Particularly, the EPDCCH is transmitted starting from the fourth symbol of a subframe to the last symbol of the subframe in FIG. 9.

The EPDCCH can be transmitted through a PDSCH region in which data is transmitted, and a UE monitors EPDCCH candidates in order to detect an EPDCCH destined therefor. That is, to acquire DCI included in the EPDCCH, the UE needs to perform blind decoding on a predetermined number of EPDCCH candidates in a search space of an aggregation level L. Like an aggregation level of a search space for the PDCCH, an aggregation level of a search space for the EPDCCH indicates the number of enhanced CCEs (ECCEs) used to transmit one piece of DCI. Accordingly, link adaptation can be performed for the EPDCCH, similarly to the PDCCH, since the EPDCCH is composed of ECCEs and thus the EPDCCH can be transmitted by combining a larger number of ECCEs when channel state is deteriorated.

In addition, ECCEs constituting the EPDCCHs can be divided into a localized ECCE (referred to as L-ECCE hereinafter) and a distributed ECCE (referred to as D-ECCE hereinafter) according to methods of mapping corresponding REs. In the case of the L-ECCE, REs constituting the ECCE are extracted from the same PRB pair and beamforming most suitable for each UE can be performed. In the case of the D-ECCE, REs constituting the ECCE are extracted from different PRB pairs and frequency diversity can be used although beamforming is restricted. EPDCCH transmission using the L-ECCE may be referred to as localized EPDCCH transmission and EPDCCH transmission using the D-ECCE may be referred to as distributed EPDCCH transmission.

Figure 10:
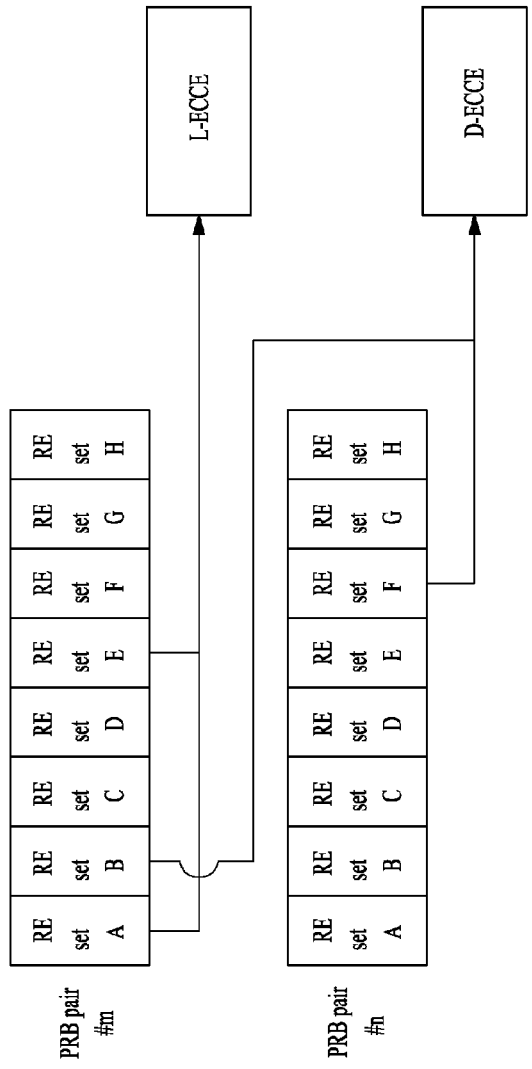
FIG. 10 illustrates concepts of a localized ECCE and a distributed ECCE.

FIG. 10 illustrates the concepts of the L-ECCE and D-ECCE. In FIG. 10, particularly, the L-ECCE and the D-ECCE are configured using two PRB pairs and it is assumed that one PRB pair is segmented into 8 RE sets, one L-ECCE is generated using 2 RE sets belonging to one PRB pair and one D-ECCE is generated using 2 RE sets respectively belonging to 2 RPB sets.

Referring to FIG. 10, RE set A and RE set E of PRB pair #m are grouped to define one L-ECCE and RE set B of PRB pair #m and RE set F of PRB pair #n are grouped to define one D-ECCE. The following description is not limited to the example of FIG. 10 and may include a case in which one PRB pair is segmented into an arbitrary number or RE sets and a case in which one D-ECCE is configured using an arbitrary number of PRB pairs.

The EPDCCH is transmitted through a predetermined PRB pair and a search space therefor is defined using the corresponding PRB pair. In the case of the D-ECCE, a search space needs to be configured by extracting RE sets from two or more PRB pairs and thus a UE needs to know PRB pairs for the D-ECCE, RE sets constituting the D-ECCE and positions of the RE sets in the PRB pairs. Here, an RE set may be referred to as an enhanced resource element group (EREG).

<First Embodiment>

A UE monitors transmission of a DCI message valid therefor through an EPDCCH in a search space defined by a specific rule and signaling. This search space is composed of a plurality of EPDCCH candidates each of which is set to a predetermined aggregation level for link adaptation. In this situation, when the UE attempts to detect the DCI message destined therefor from each EPDCCH candidate, the UE may not recognize the aggregation level of the actually transmitted DCI.

Figure 11:
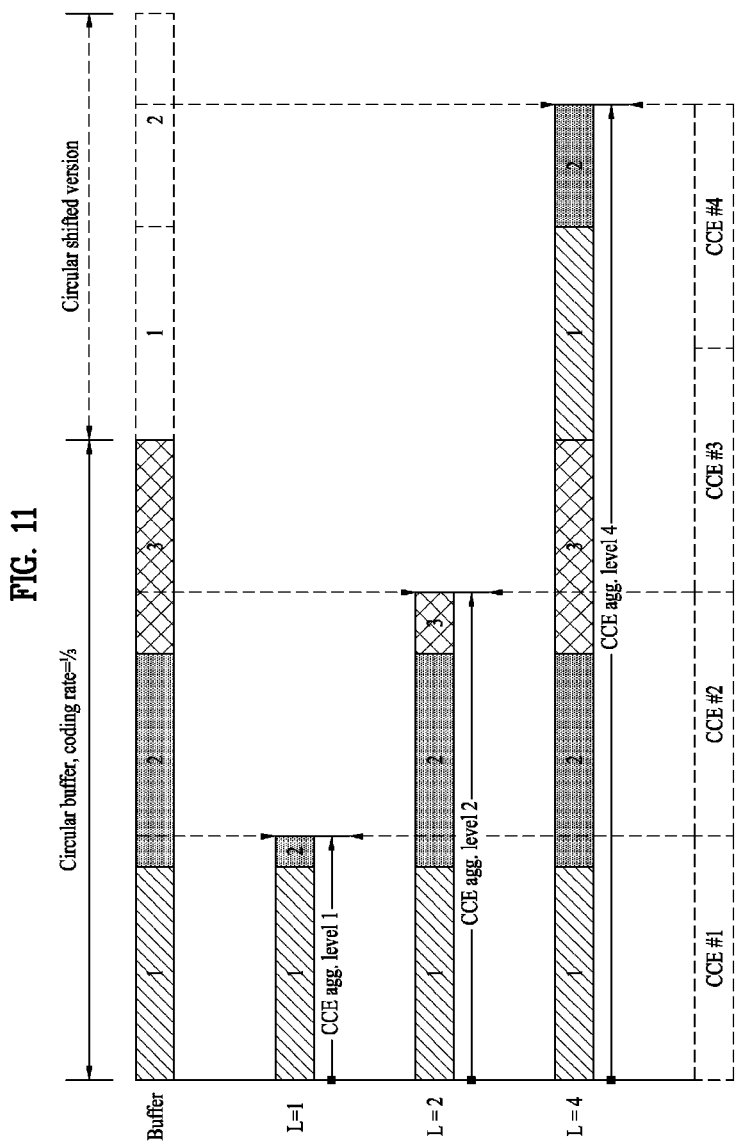
FIG. 11 illustrates a conventional DCI mapping method.

FIG. 11 illustrates a conventional DCI mapping method. In FIG. 11, it is assumed that bits of a DCI message coded by a channel encoder are stored in a circular buffer and then sequentially read.

Referring to FIG. 11, the sequentially read coded bits are sequentially mapped to CCEs according to aggregation level. When CCEs to which the DCI message is mapped are arranged between aggregation levels, as shown in FIG. 11, there may be confusion about the starting location of the DCI message actually transmitted by an eNB. Particularly, since mapping of the DCI message is finished at the end point of a specific CCE, the first bit of the DCI message may be remapped to the next CCE. For example, when the number of coded bits of the DCI message corresponds to the number of bits transmitted through one CCE, the first bit of the DCI message is mapped again to CCE #2 and thus the UE considers CCE #1 and CCE #2 as having respective starting locations and considers transmission of CCE #1 and CCE #2 as valid EPDCCH transmission.

When there is confusion about the starting location of the DCI message, as described above, the eNB and the UE perform operations which do not correspond to each other and thus smooth communication may not be performed therebetween. In particular, if the UE confuses aggregation levels when resources for uplink ACK/NACK depend on ECCEs used for DCI, then the resources for uplink ACK/NACK become different from those intended by the eNB.

The first embodiment of the present invention presents a method for preventing confusion of aggregation levels of a DCI message transmitted from the eNB by previously controlling the length of the DCI message when there is possibility that the UE confuses aggregation levels of the DCI message. To control the length of the DCI message, it is possible to consider an operation of adding a predetermined number of bits having no information to the DCI message (which is referred to as bit padding hereinafter).

The starting location of the DCI massage may be misrecognized when the start of transmission of the DCI message is repeated at a boundary of CCEs aggregated as shown in FIG. 11. In this case, if the length of the DCI message is increased through bit padding such that a boundary of aggregated CCEs does not correspond to a point at which repetition of the DCI message is started, then transmission of the DCI message is started from a portion other than the first bit of the DCI message at the second CCE. Accordingly, the UE recognizes that the second CCE is not the first CCE of the currently transmitted DCI message and thus confusion about the starting location of the DCI message can be prevented.

While the method for preventing confusion of the starting location of the DCI message using bit padding is applied to the PDCCH, CCEs constituting the PDCCH have a fixed size (36 REs) and thus a bit padding application standard can be simplified. That is, when the length of a specific DCI message is set to a specific value and thus the number of channel-coded bits corresponds to the number of bits that can be transmitted over one, two or four CCEs, only one bit is padded.

However, ECCEs constituting the EDPCCH differ from CCEs in that the ECCEs are transmitted in a PDSCH region and thus the number of bits that can be transmitted through each ECCE varies with the length of a PDCCH transmitted in a corresponding subframe, presence or absence of a CRS in a data region of the subframe, whether a CSI-RS is transmitted and the like. In this situation, when the bit padding application standard is simplified so as to fix the length of the DCI message to a predetermined value, confusion about the starting location of the DCI message cannot be prevented. Accordingly, there is a need for an appropriate bit padding method capable of preventing confusion of the starting location of the DCI message even when the number of available bits of each ECCE of the EPDCCH is varied.

To solve the aforementioned problem, the present invention provides a method of detecting resources available for an EPDCCH in a corresponding subframe, determining the number of bits available for a specific EPDCCH candidate and adaptively performing bit padding when the starting location of a DCI message is confused.

Specifically, the eNB channel-codes a DCI message of X-bits, recognizes that the size of coded bits is Y, and then detects the number of bits available for a specific EPDCCH candidate of an EPDCCH. For convenience of description, it is assumed that ECCE #0, ECCE #1, . . . , ECCE #(L−1) are used for an EPDCCH having an aggregation level L and the DCI message is mapped to ECCEs from an ECCE having a lowest index. In addition, it is assumed that ECCE #n can carry Nn bits. ECCE indexes described in the present embodiment are exemplary and ECCEs constituting a specific EPDCCH may have non-consecutive indexes and ECCE use order (i.e. DCI mapping order) may be determined irrespective of indexes of ECCEs.

On the aforementioned assumption, the eNB sequentially maps the coded Y-bit DCI message to ECCEs starting from ECCE #0. When the last bit of the DCI message is mapped to the last bit of a specific ECCE and thus the next ECCE starts from the first bit of the DCI message, the starting location of the DCI message is misrecognized. In this case, the eNB can pad the DCI message before being coded with a predetermined number of bits so as to increase the number of coded bits to Y'. For example, the eNB can add 1 bit to the DCI message to generate an (X+1)-bit DCI message. Here, when a coding rate is r, the number of coded bits is Y'=(X+1)/r.

Confusion condition that requires bit padding, that is, confusion condition 1 that causes confusion of the starting location can be represented as follows.

$$N_0+N_1+\ldots+N_k=a\cdot Y \qquad \text{<Confusion condition 1>}$$

(k=0, 1, 2, . . . , L−2 and a(>0) is an integer)

Alternatively, it is possible to determine whether the confusion condition is satisfied only for an EPDCCH candidate, which is generated using ECCEs used for an EPDCCH candidate having aggregation level L, in a search space defined in a specific subframe, such as confusion condition 2 represented as follows.

$$N_0+N_1+\ldots+N_k=a\cdot Y \qquad \text{<Confusion condition 2>}$$

(a(>0) is an integer, k is an integer in the range of 0 to L−2, and an EPDCCH candidate of the corresponding UE, which starts from ECCE # (k+1) and ends before ECCE #(L−1), is present.)

The eNB checks whether confusion condition 1 and/or confusion condition 2 are satisfied and prevents confusion among aggregation levels by padding the DCI message with bits when confusion condition 1 and/or confusion condition 2 are satisfied.

Figure 12:
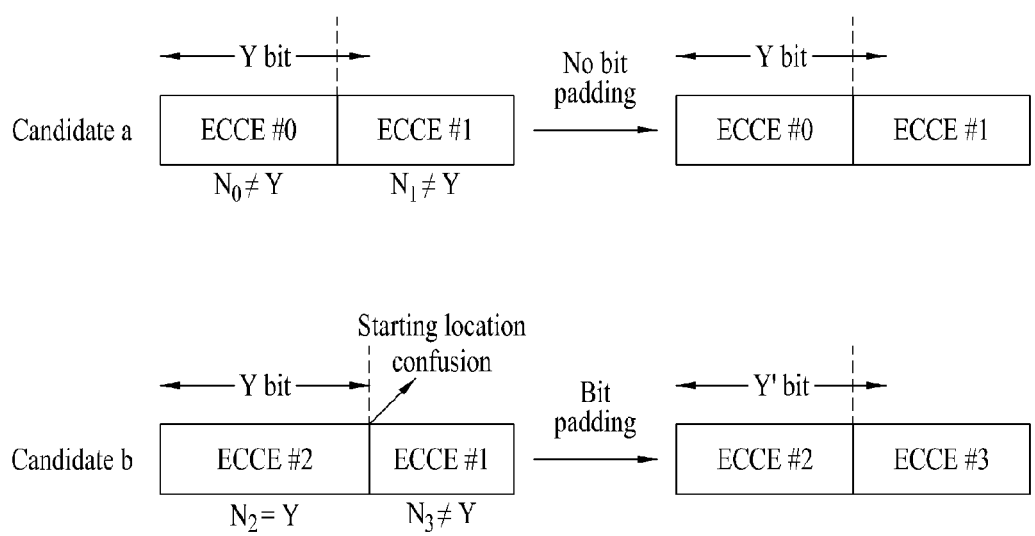
FIG. 12 illustrates an example of applying bit padding to DCI transmitted through an EPDCCH according to a first embodiment of the present invention.

FIG. 12 illustrates an example of applying bit padding to DCI transmitted through an EPDCCH according to the first embodiment of the present invention. Particularly, FIG. 12 shows an operation of preventing confusion of aggregation level 2 with aggregation level 1 through bit padding when an EPDCCH having aggregation level 2 is transmitted.

Referring to FIG. 12, in the case of EPDCCH candidate #a composed of ECCE #0 and ECCE #1, a number of ECCE are appropriate and thus confusion does not occur. Accordingly, bit padding is not performed. In the case of EPDCCH candidate #b which is present in the same subframe and composed of ECCE #2 and ECCE #3, however, the number of ECCE for EPDCCH candidate #b differs from the number of ECCE for EPDCCH candidate #a, and confusion of aggregation level 2 with aggregation level 1 may occur according to the aforementioned conditions and thus bit padding is performed. Accordingly, even for EPDCCH candidates which are present in the same subframe and have the same aggregation level, whether to perform bit padding may change as the number of available bits of ECCEs varies.

Even when the aforementioned confusion conditions are checked, bit padding is performed according to the checked result and the number of coded bits of the DCI message is changed as a result of bit padding, confusion may occur by other conditions.

Figure 13:
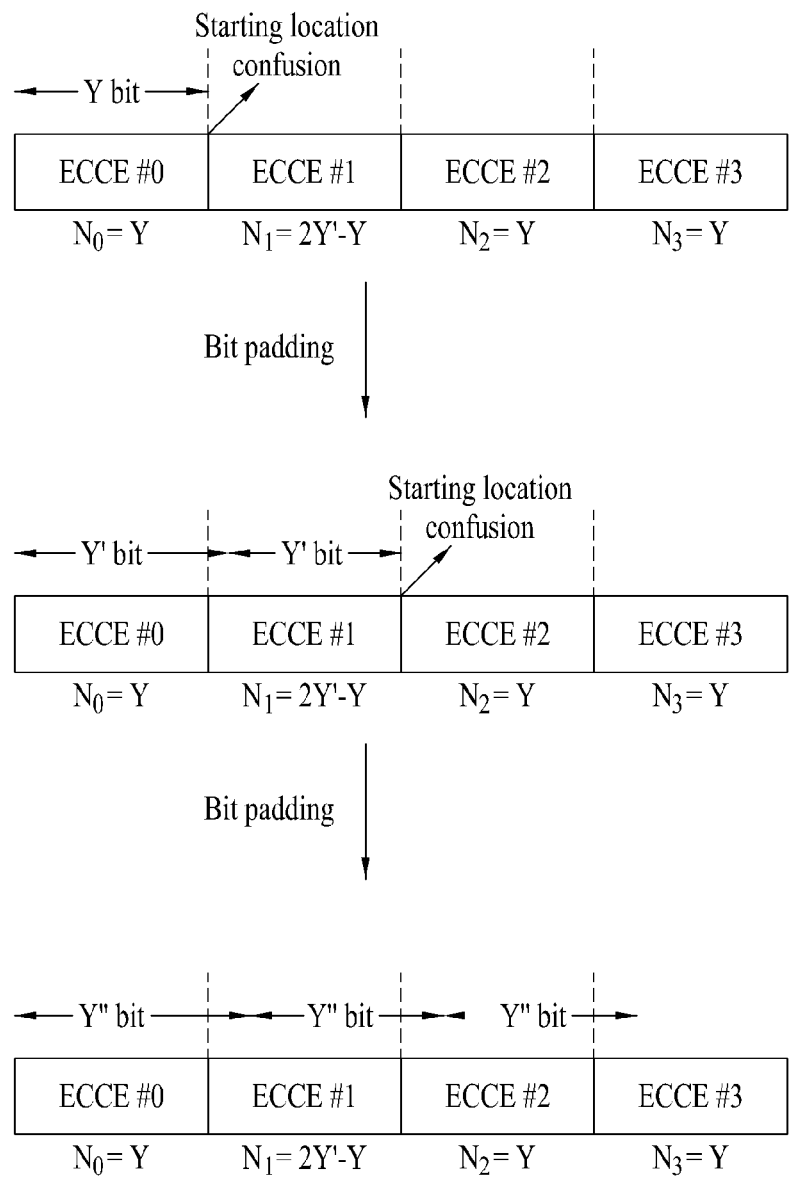
FIG. 13 illustrates another example of applying bit padding to DCI transmitted through an EPDCCH according to the first embodiment of the present invention.

FIG. 13 illustrates another example of applying bit padding to DCI transmitted through an EPDCCH according to the first embodiment of the present invention.

Referring to FIG. 13, when the EPDCCH is transmitted at aggregation level 4 and ECCE #0 has a size of Y bits, the size of coded bits of the DCI message can be increased to Y' through bit padding when the confusion conditions are satisfied. In this case, however, the sum of the number of bits of ECCE #0 and the number of bits of ECCE #1 equals 2Y' and thus starting location confusion may occur at ECCE #2.

When confusion occurs at a position upon prevention of confusion at another position through bit padding, as described above, it is necessary to perform additional bit padding and set the coded bits of the DCI message to Y" bits such that confusion does not occur at any position. That is, bit padding is repeated until confusion does not occur at any position.

Alternatively, to avoid repeated bit padding as described with reference to FIG. 13, confusion condition 1 or confusion condition 2 may be modified such that, when bit padding is performed for EPDCCH candidates of aggregation level L, starting location confusion is checked only for EPDCCH candidates of aggregation level L/2.

For example, when an EPDCCH of aggregation level 4 is transmitted using ECCE #0, ECCE #1, ECCE #2 and ECCE #3, confusion is checked in consideration of only the number of transmittable bits of an EPDCCH candidate of aggregation level 2 and bit padding is performed according to the checked result. In this case, while starting location confusion may occur at a lower aggregation level, the possibility that the confusion occurs can be considered to be very low since aggregation levels have a large gap therebetween. Accordingly, the aforementioned method is effective in that the number of padded bits is reduced. In this case, confusion condition 1 and confusion condition 2 may be respectively modified into confusion condition 3 and confusion condition 4.

$$N_0+N_1+\ldots+N_{(L/2-1)}=a\cdot Y \qquad \text{<Confusion condition 3>}$$

(a(>0) is an integer)

$$N_0+N_1+\ldots+N_{(L/2-1)}=a\cdot Y \qquad \text{<Confusion condition 4>}$$

(a(>0) is an integer and an EPDCCH candidate of the corresponding UE, which uses ECCE #(L/2), ECCE #(L/2+1), . . . , ECCE #(L−1), is present.)

If an EPDCCH transmission basic unit is set to two ECCEs instead of one ECCE in the corresponding subframe due to large overhead such as CRS or CSI-RS, then the aforementioned bit padding operation can be applied, considering one unit consisting of two ECCEs as an EPDCCH transmission unit like an ECCE.

<Second Embodiment>

One PRB pair is too large a resource unit to carry one DCI message, in general. Accordingly, one PRB pair is divided into a plurality of ECCEs and one or more ECCEs are combined on the basis of a link state or channel state of a corresponding UE and used to transmit one DCI message. Here, REs occupied by each ECCE in the PRB pair may correspond to one or more specific OFDM symbols or one or more specific subcarriers in the PRB pair or may be randomly mixed with REs of another ECCE in the PRB pair.

3GPP LTE supports three downlink resource allocation types.

In the case of resource allocation type #0, resource allocation is performed in such a manner that a plurality of neighboring PRB pairs is grouped into one resource block group (RBG) and whether each RBG is allocated to a corresponding PDSCH is indicated through a resource allocation bitmap included in a DCI message.

According to resource allocation type #1, resource allocation is performed in such a manner that an RBG subset is selected through a predetermined indicator and whether each PRB pair is allocated to a corresponding PDSCH in the selected RBG set is indicated through another indicator.

Resource allocation type #2 performs continuous RB allocation in such a manner that the starting points of RBs allocated to a PDSCH and the number of RBs allocated to the PDSCH are indicated. The allocated RBs are mapped to a PRB pair (localized RB mapping) or permuted and mapped to a PRB pair (distributed RB mapping).

In transmission of a PDSCH, a PRB pair through which an EPDCCH is transmitted needs to be excluded because the possibility that the PRB pair used to transmit the EPDCCH includes an EPDCCH for a different UE is high and the quantity of resources to be allocated to the PDSCH is very small. That is, when the UE considers that the EPDCCH is transmitted through a specific PRB pair, the UE needs to assume that the PRB pair is not used for PDSCH transmission, that is, the PRB pair is an EPDCCH PRB pair, and to receive the PDSCH through a PRB pair other than the PRB pair even if the PRB pair belongs to a region allocated to the PDSCH of the UE according to resource allocation type #0 or resource allocation type #2.

In other words, the EPDCCH PRB pair is muted during PDSCH transmission in PDSCH mapping. For codewords, puncturing that assumes transmission power is 0 may be performed on the assumption that coded bits are mapped to a corresponding PRB pair, or rate matching that skips the corresponding PRB pair during mapping of the coded bits may be performed.

The UE may recognize the EPDCCH PRB pair using one of the following methods.

Method 1) The UE blind-decodes the EPDCCH destined therefor and considers a PRB pair from which the EPDCCH is detected as an EPDCCH PRB pair. Here, the EPDCCH may be limited to an EPDCCH for downlink allocation, which schedules a PDSCH, because PDSCH demodulation is not performed when the EPDCCH for downlink allocation is not detected through blind decoding whereas an error may be generated in PDSCH demodulation when EPDCCHs for other purposes are not detected through blind decoding.

Figure 14:
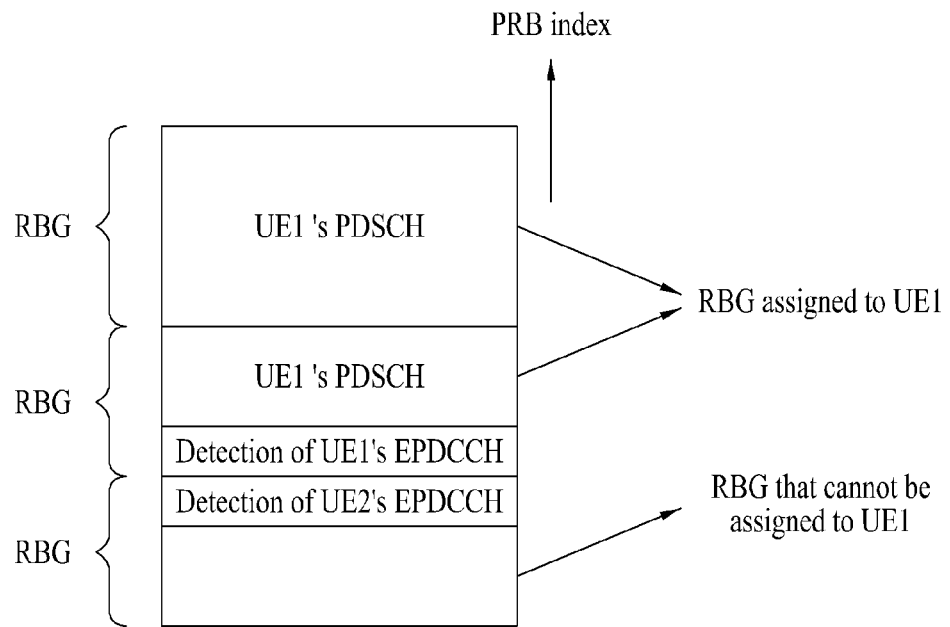
FIG. 14 illustrates an example of assuming a resource region for a PDSCH when an EPDCCH is transmitted according to a second embodiment of the present invention.

FIG. 14 illustrates an example of assuming a resource region for a PDSCH when an EPDCCH is transmitted according to the second embodiment of the present invention. Particularly, FIG. 14 shows a case in which UE1 blind-decodes an EPDCCH destined therefor, considers a PRB pair from which the EPDCCH is detected as an EPDCCH PRB pair and does not use the PRB pair for PDSCH transmission according to the aforementioned method 1.

Method 2) A UE considers a PRB pair through which an EPDCCH destined therefor or an EPDCCH of another UE can be transmitted as an EPDCCH PRB pair. Here, the PRB pair through which the EPDCCH can be transmitted may be a PRB pair for which an EPDCCH search space is defined. The PRB pair through which the EPDCCH can be transmitted may be signaled to the UE through a higher layer signal such as an RRC signal. Otherwise, a set of candidates may be previously signaled to the UE through a higher layer signal and then a PRB pair, which needs to be regarded by the UE as a PRB pair through which the EPDCCH can be transmitted in each subframe, may be signaled to the UE through specific physical layer signaling.

Figure 15:
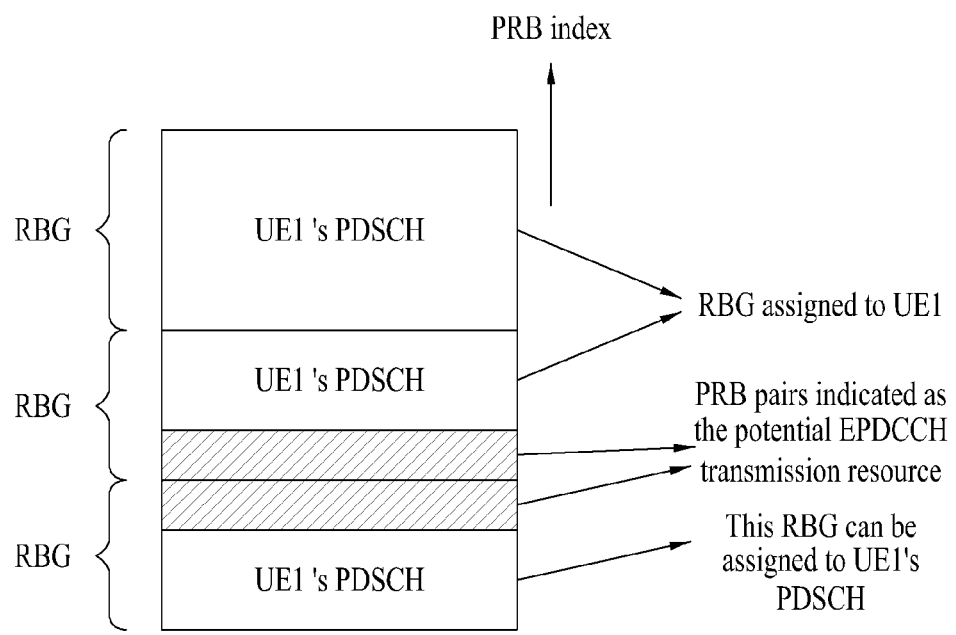
FIG. 15 illustrates another example of assuming a resource region for a PDSCH when an EPDCCH is transmitted according to the second embodiment of the present invention.

FIG. 15 illustrates another example of assuming a resource region for a PDSCH when an EPDCCH is transmitted according to the second embodiment of the present invention. Particularly, FIG. 15 shows a case in which UE1 considers all PRB pairs through which the EPDCCH thereof and an EPDCCH of UE2 can be transmitted as EPDCCH PRB pairs and does not use the PRB pairs for PDSCH transmission according to method 2.

The aforementioned two methods have respective advantages and disadvantages.

As to method 1, a PRB pair, which is not used for EPDCCH transmission, can be used for PDSCH transmission since only the PRB pair capable of being used for EPDCCH transmission, from among PRB pairs through which the EPDCCH can be transmitted, is excluded from PDSCH transmission. However, since the UE cannot be aware of whether an EPDCCH of another UE is transmitted, a region including the PRB pair used to transmit the EPDCCH of the other UE cannot be used for a PDSCH of the corresponding UE.

In the case of method 2, all PRB pairs through which EPDCCHs including the EPDCCH of the other UE can be transmitted are excluded from PDSCH transmission, and thus the UE can transmit the PDSCH without being affected by transmission of the EPDCCH of the other UE. However, a large amount of resources cannot be used for PDSCH transmission since all PRB pairs through which EPDCCHs can be transmitted are not used.

The present invention presents a method of adaptively selecting method 1 and method 2 according to system bandwidth or subframe property such as the number of REs that can be used for an EPDCCH, in order to appropriately harmonize the advantages and disadvantages of the above-described methods.

A method to be actually applied between method 1 and method 2 may be determined on the basis of RBG size. For example, in 3GPP LTE, RBG size depends on a system bandwidth and is determined using Table 4.

TABLE 4

| System Bandwidth $N_{RB}^{DL}$ | RBG Size (P) |
|---|---|
| ≤10 | 1 |
| 11-26 | 2 |
| 27-63 | 3 |
| 64-110 | 4 |

Referring to Table 4, when the system bandwidth is less than a predetermined threshold and thus the RBG size is small (e.g. when an RBG is composed of one or two PRB pairs), the possibility that a plurality of PRB pairs is used for EPDCCHs of a plurality of UEs and PDSCHs simultaneously in one RBG is very low. This means that, when one PRB pair is used for an EPDCCH in one RBG, another PRB pair is not preferably used for the EPDCCH. In this case, it is desirable to select method 1 capable of switching use of resources between the EPDCCH and the PDSCH.

Conversely, when the system bandwidth increases and thus the RBG size increases (e.g. an RBG is composed of three or four PRB pairs), it is desirable to select method 2 so as to allow higher degree of freedom for PDSCH resource allocation since the number of PRB pairs through which the EPDCCH can be transmitted is relatively small.

While the RBG size may correspond to the number of PRB pairs which constitute an RBG, the RBG size may be an effective RBG size considering other factors. For example, the effective RBG size can be determined on the basis of whether signals such as a CRS/CSI-RS/PDCCH are transmitted in a specific subframe and the number of available REs, determined by the length of a DwPTS in a special subframe of a TDD system. That is, the effective RBG size can be considered large when a relatively large number of available REs is present and small when a relatively small number of REs is present, and thus an appropriate method can be selected from method 1 and method 2.

Particularly, the effective RBG size can be determined by the number of ECCEs or EREGs, a basic unit of EPDCCH transmission, in a single PRB pair. For example, when a relatively large number of available REs is present and thus a larger number of ECCEs or EREGs can be generated in one PRB pair, the effective RBG size can be considered large.

When the number of ECCEs or EREGs in a PRB pair is determined irrespective of the number of available REs, the effective RBG size may be determined on the basis of a minimum number of components of an EPDCCH candidate when the EPDCCH candidate is configured, that is, the number of ECCEs or EREGs of an EPDCCH candidate composed of a minimum number of resources. In other words, the effective RBG can be considered large when a minimum EPDCCH candidate is composed of one ECCE and small when the minimum EPDCCH candidate is composed of two ECCEs. Accordingly, an appropriate PDSCH resource allocation method can be selected on the basis of the effective RBG size.

Method 1 or method 2 may be applied only when the system bandwidth is greater than a predetermined level. For example, when one RBG is composed of one PRB pair since the system bandwidth is excessively narrow, a PDSCH can be allocated to a PRB pair other than an EPDCCH PRB pair even when resource allocation type #0 is used. In this case, operation can be performed without using method 1 or method 2. In other cases, PDSCH mapping can be performed using an appropriate method according to situation.

While an RBG actually occupies a large number of PRB pairs, method 1 may be modified when the effective RBG size is small. Specifically, a plurality of PRB pairs is grouped into one sub-group in one RBG. When an EPDCCH is detected from any one of the PRB pairs, it is considered that the EPDCCH is detected from the sub-group and the sub-group is excluded from transmission. In other words, one sub-group including a predetermined number of ECCEs or EREGs is configured to secure minimum EPDCCH transmission resources, and a PDSCH is allocated avoiding the sub-group when an EPDCCH is detected from part of the sub-group.

For example, when one RBG is composed of four PRB pairs and the number of available REs for an EPDCCH is relatively small and thus two or three ECCEs are defined per PRB pair, the four PRB pairs are divided into two sub-groups each including two PRB pairs and, when the UE detects an EPDCCH from a PRB pair belonging to a specific sub-group, the UE considers the whole specific sub-group as an EPDCCH PRB pair.

This operation can be used as a modification of applying the principle of method 1 more safely when the effective RBG size is small and a plurality of EPDCCHs is transmitted to one UE using one RBG.

Figure 16:
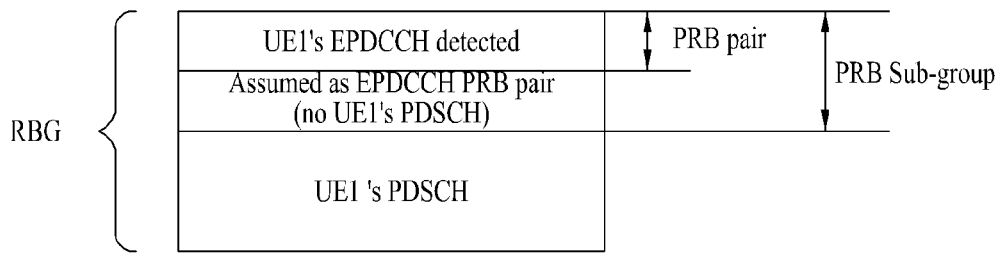
FIG. 16 illustrates an example of mapping an EPDCCH to a PDSCH according to the second embodiment of the present invention.

FIG. 16 illustrates an example of mapping an EPDCCH to a PDSCH according to the second embodiment of the present invention.

Referring to FIG. 16, one RBG composed of four PRB pairs is divided into two sub-groups, downlink allocation information is transmitted using one PRB pair belonging to one sub-group, and an uplink grant is transmitted using the other PRB pair. Accordingly, the other sub-group can be used for the PDSCH.

Alternatively, the eNB can signal, to the UE, which one of the aforementioned PDSCH resource allocation methods (method 1, method 2 or neither) will be used through a higher layer signal such as an RRC signal such that the eNB can select an appropriate method according to scheduling operation thereof. Here, the eNB can indicate method 1 or method 2 to be used or indicate neither method. Furthermore, the resource allocation method used by the eNB may be changed per subframe in consideration of the number of available REs for an EPDCCH in each subframe. For example, the eNB can divide all subframes into multiple subsets and indicate a PDSCH resource allocation method to be applied to each subset.

<Third Embodiment>

As described above, one DCI message is transmitted by combining one or more ECCEs according to link state of the corresponding UE. Different UEs may use different ECCEs. In this case, ECCEs belonging to one PRB pair are preferably related to different DM-RS antenna ports since it is desirable to apply different beamforming to respective UEs.

Figure 17:
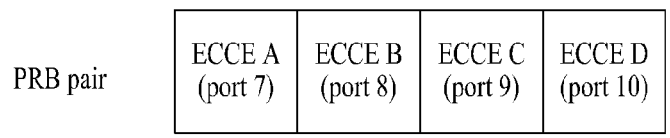
FIG. 17 illustrates the relationship between ECCEs and DM-RS antenna ports.

FIG. 17 illustrates the relationship between ECCEs and DM-RS antenna ports.

Referring to FIG. 17, one PRB pair is segmented into four ECCEs and the ECCEs are respectively related to DM-RS antenna ports #7 to #10. According to this structure, a maximum of four DCI messages can be simultaneously transmitted by performing beamforming per DCI message in one PRB pair. As described above, positions of REs occupied by each ECCE in the PRB pair may correspond to one or more specific OFDM symbols or subcarriers occupied by each ECCE, or the REs may be randomly mixed with REs of another ECCE in the PRB pair.

According to the ECCE configuration shown in FIG. 17, a plurality of ECCEs present in the same PRB pair may be aggregated to transmit one DCI message. In this case, it is desirable to demodulate all the aggregated ECCEs through a single DM-RS antenna port since DM-RS transmission power can be boosted when the ECCEs share a single DM-RS. For example, when ECCE #A and ECCE #B are aggregated in the example shown in FIG. 17, both ECCEs are demodulated using either antenna port #7 or antenna port #8.

When a plurality of ECCEs is aggregated, however, it is necessary to define a standard of appropriately selecting one of antenna ports, which are respectively related to the ECCEs. This standard may be signaled by the eNB through higher layer signaling such as RRC signaling or derived from a parameter such as a C-RNTI of the corresponding UE or a subframe index according to a predetermined rule. Here, the important point is that different UEs may use different DM-RS antenna ports for demodulation even when the UEs use the same ECCE set since the UEs have different standards of selection. Particularly, when different UEs perform beamforming using different antenna ports, multi-user (MU) MIMO can be employed.

The following description is based on the assumption that a specific UE has a specific standard of selecting an antenna port. This means that each antenna port has priority in antenna port selection. That is, when two ECCEs are aggregated, the ECCEs are demodulated using an antenna port having higher priority, selected from two antennas respectively related to the two ECCEs. In selection of one of four or more antenna ports, an antenna port having highest priority is selected.

In the case of the PDCCH, DCI messages are sequentially mapped on the basis of CCE indexes. When this scheme is applied to the EPDCCH, the UE may confuse the starting location of a corresponding DCI message.

Figure 18:
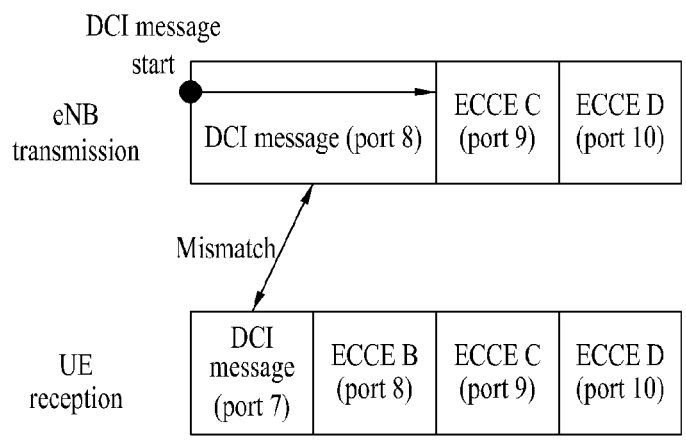
FIG. 18 illustrates a problem that can be generated when a conventional mapping scheme is applied to the EPDCCH.

FIG. 18 illustrates a problem that may be generated when the conventional mapping method is applied to the EPDCCH.

Referring to FIG. 18, it is assumed that a DCI message is transmitted using ECCE #A and ECCE #B and antenna port #8 has higher priority. In addition, it is assumed that the eNB selects antenna port #8, maps the DCI message to ECCE #A having a lower index and then maps the DCI message to ECCE #B for DCI message transmission.

In this case, when ECCE #A is set to a search space of aggregation level 1 for the corresponding UE, the UE attempts to detect ECCE #A using antenna port #7. Since part of the DCI message is transmitted through ECCE #A even though the eNB does not transmit a DM-RS through antenna port #7, there is a possibility that the UE can correctly receive the DCI message using only ECCE #A. In this case, the ECCE used by the eNB does not correspond to the ECCE used by the UE. Particularly, when a resource, through which ACK/NACK for a PDSCH scheduled by the DCI message will be transmitted, is determined by an ECCE having highest priority from among used ECCEs, the UE may use the wrong ACK/NACK resource.

This problem can be solved by changing the order of mapping the DCI message to ECCEs. The present invention provides a method of determining the order of mapping the DCI message to ECCEs according to the standard of selecting an antenna port from antenna ports respectively related to the ECCEs when the DCI message is transmitted using a plurality of ECCEs. For example, an ECCE related to an antenna port having highest priority is first mapped to the DCI message in transmission of the DCI message.

Figure 19:
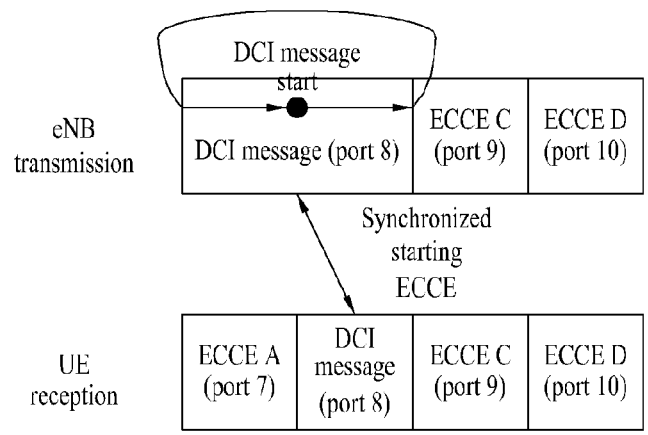
FIG. 19 illustrates an example of allocating a plurality of ECCEs to a DCI message according to a third embodiment of the present invention.

FIG. 19 illustrates an example of allocating a plurality of ECCEs to a DCI message according to the third embodiment of the present invention. Particularly, FIG. 19 shows application of the present invention to the situation of FIG. 18.

Referring to FIG. 19, since ECCE #B related to antenna port #8 having high priority is first mapped to the DCI message, the UE shares the assumption that ECCE #B is used with the eNB even though the UE successfully detects the DCI message only using ECCE #B (i.e. even though the UE successfully detects the DCI message on the assumption of aggregation level 1). Accordingly, there is no problem in the operation related to the ECCE used for DCI detection. Though the UE may attempt to detect the DCI message using ECCE #A, DCI based on the assumption that the DCI is started at ECCE #A cannot be detected because DCI mapping is started from ECCE #B, and thus the problem illustrated in FIG. 18 can be prevented.

When two or more ECCEs are aggregated, DCI message mapping may be performed by selecting one of the following methods.

Method A) The DCI message is mapped using aggregated ECCEs in order of priority of antenna ports related thereto.

Method B) An ECCE having highest priority is selected from aggregated ECCEs and the DCI message is mapped from the selected ECCE in order of index.

When the UE has no standard of selecting an antenna port, the DCI message may be mapped to ECCEs in order of ECCE index. When two ECCEs are related to the same antenna port, the DCI message may be mapped to the two ECCEs in order of ECCE index.

Upon determination of the order of mapping the DCI message to ECCEs according to the aforementioned method, mapping may be performed in such a manner that the DCI message is mapped to an ECCE in the determined order and, when mapping to all REs of the ECCE is ended, the DCI message is mapped to the next ECCE. Alternatively, the DCI message may be partially mapped per ECCE. For example, one ECCE is selected according to ECCE mapping order, and then an operation of mapping part of bits of DCI to part of the REs corresponding to the selected ECCE and mapping part of the bits of the DCI to part of the REs corresponding to the next ECCE is repeated. In this case, consecutive bits of the DCI message are prevented from being concentrated on a specific ECCE.

Alternatively, when the eNB transmits the DCI message, the eNB may scramble the DCI message using the index of an antenna port used to transmit the DCI message. According to this method, when the assumption of the UE for an antenna port to be used does not correspond to the assumption of the eNB for an antenna port to be used, the UE fails to detect the DCI message when the DCI message cannot be successfully descrambled. Accordingly, an incorrect operation due to DCI confusion can be prevented. For example, the PDCCH is scrambled according to a sequence initialized based on $c_{init}=\lfloor n_s/2 \rfloor 2^9+N_{ID}^{cell}$. This initialization equation may include the index of an antenna port used to transmit the corresponding EPDCCH. Expression 3 is an initialization equation including the index of an antenna port used to transmit the EPDCCH.

$$c_{init}=\lfloor n_s/2 \rfloor 2^9+N_{ID}^{cell}+X \quad \text{[Expression 3]}$$

(where X=(index of the used antenna port)−7)

Since the above-described methods are used to solve the problem generated when one of antenna ports related to a plurality of ECCEs is selected, the methods can be used for EPDCCH which requires antenna port selection, particularly, localized EPDCCH transmission through aggregation of ECCEs present in the same PRB pair.

<Fourth Embodiment>

A description will be given of a method for disposing EPDCCH candidates of various aggregation levels in a single PRB pair according to the fourth embodiment of the present invention.

Localized EPDCCH transmission using a plurality of ECCEs included in a single PRB pair can transmit an EPDCCH more effectively by selecting a PRB pair advantageous to a specific UE. Accordingly, it is advantageous to locate as many EPDCCH candidates as possible in a specific PRB pair. However, if a plurality of EPDCCH candidates is located in one PRB pair, sharing part of the ECCEs corresponding to the PRB pair, then all the EPDCCH candidates cannot be used to transmit the EPDCCH of the corresponding UE when the shared ECCEs are used for a different purpose, leading to blocking probability increase. Accordingly, there is a need for a method for appropriately arranging a plurality of EPDCCH candidates within one PRB pair.

To this end, according to the fourth embodiment of the present invention, an EPDCCH candidate of aggregation level 1 is configured using one of four ECCEs when the four ECCEs are present in a PRB pair and an EPDCCH candidate of aggregation level 2 is configured using two selected from the remaining three ECCEs.

Figure 20:
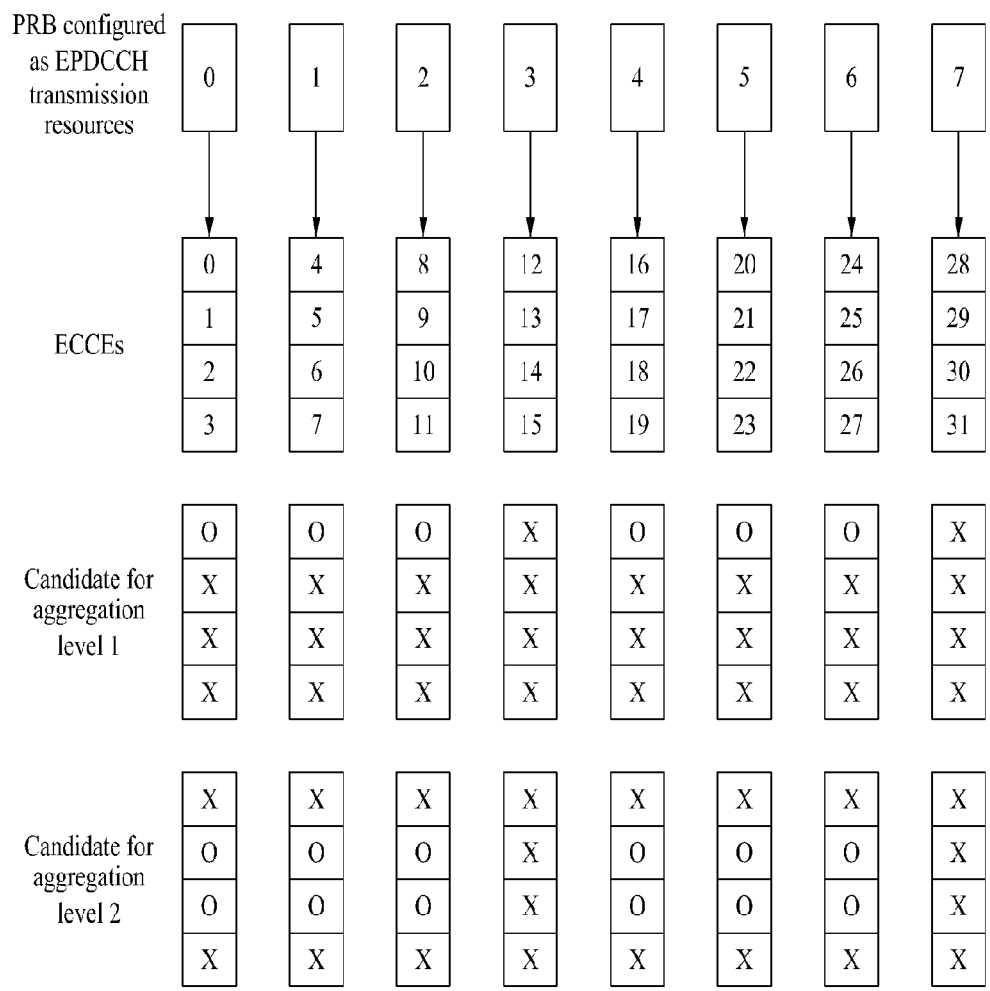
FIG. 20 illustrates an example of configuring EPDCCH candidates of aggregation level 1 and aggregation level 2 according to a fourth embodiment of the present invention.

FIG. 20 illustrates an example of configuring EPDCCH candidates of aggregation level 1 and aggregation level 2 according to the fourth embodiment of the present invention.

FIG. 20 assumes a case in which eight PRB pairs are defined as an EPDCCH search space and six EPDCCH candidates are defined for each of aggregation level 1 and aggregation level 2.

Referring to FIG. 20, a PRB pair including an EPDCCH candidate of aggregation level 1 includes an EPDCCH candidate of aggregation level 2 and different ECCEs are determined for the EPDCCH candidate of aggregation level 1 and the EPDCCH candidate of aggregation level 2. This can be implemented by assigning an appropriate offset between search spaces of aggregation level 1 and aggregation level 2. When ECCEs belonging to the same PRB pair are sequentially indexed, as shown in FIG. 20, an offset of 1 or 2 may be assigned to the search space of aggregation level 1 and the search space of aggregation level 2 may be formed from an ECCE spaced by the offset from the search space of aggregation level 1. When the ECCEs are indexed in a different manner, it is obvious that a different offset can be assigned between the two search spaces and the same operation can be performed.

A different method may be applied to aggregation level 4 since an EPDCCH candidate of aggregation level 4 can be generated only when all ECCEs belonging to one PRB pair are used. One method is to allow an EPDCCH candidate of aggregation level 4 to share ECCEs with an EPDCCH candidate of aggregation level 1 or 2. Another method is to dispose the EPDCCH candidate of aggregation level in a PRB pair in which the EPDCCH candidate of aggregation level 1 or 2 is not present.

Figure 21:
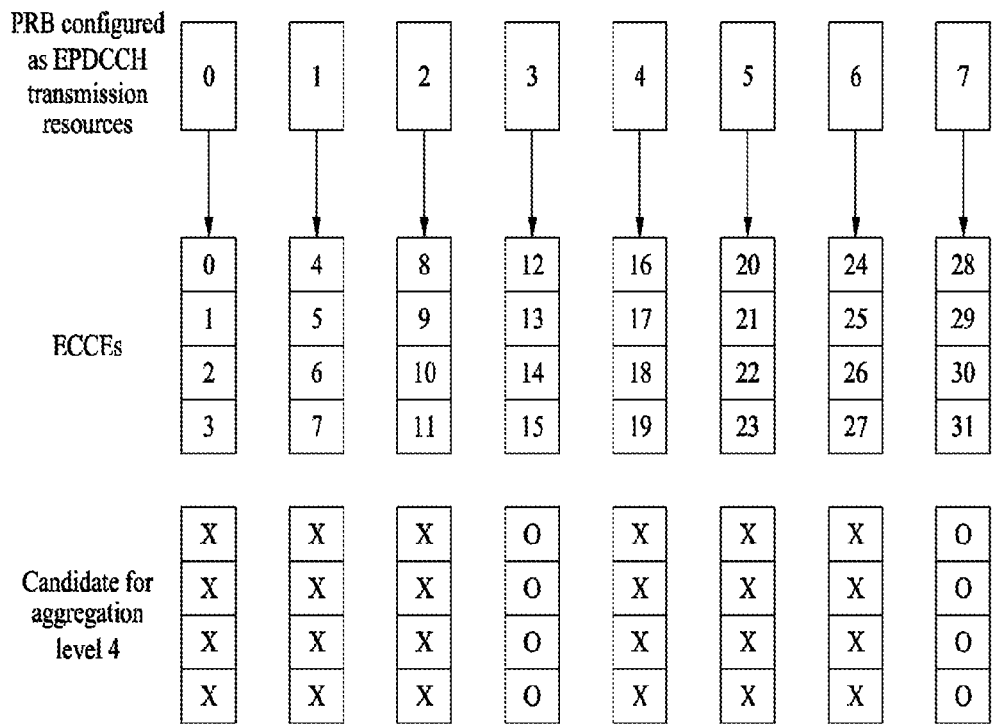
FIG. 21 illustrates an example of configuring an EPDCCH candidate of aggregation level 4 according to the fourth embodiment of the present invention.

FIG. 21 illustrates an example of configuring an EPDCCH candidate of aggregation level 4 according to the fourth embodiment of the present invention. Particularly, FIG. 21 shows a case in which two EPDCCH candidates of aggregation level 4 are set using two PRB pairs in which EPDCCH candidates of aggregation levels 1 and 2 as shown in FIG. 20 are not present.

Referring to FIG. 21, the EPDCCH candidates of aggregation level 4 may be implemented by providing an offset k' N to the search space of aggregation level 1. Here, N denotes the number of ECCEs corresponding to one PRB pair and k is an integer by which PRB pairs including the EPDCCH candidates of aggregation level 1 and aggregation level 2 can be avoided, which can be regarded as the number of consecutive PRB pairs including the EPDCCH candidates of aggregation level 1 and aggregation level 2. For example, k is 3 and N is 4 in FIG. 21.

Comparing the search space offset of aggregation level 2 with the search space offset of aggregation level 4, the offset of aggregation level 2 can be set to a value less than N such that the EPDCCH candidate of aggregation level 2 is disposed in the same PRB pair as that including the EPDCCH candidate of aggregation level 1, whereas the offset of aggregation level 4 can be set to a value greater than or equal to N such that the EPDCCH candidate of aggregation level 4 is disposed in a PRB pair other than the PRB pair including the EPDCCH candidate of aggregation level 1. More specifically, the offset may be limited to a multiple of N.

In the case of aggregation level 8, two PRB pairs need to be used all the time when four ECCEs are formed per PRB pair, and thus localized EPDCCH transmission is impossible and distributed EPDCCH transmission can be used. For example, four arbitrary PRB pairs can be selected and two ECCEs can be extracted from each PRB pair to generate an EPDCCH candidate of aggregation level 8.

In particular, two ECCEs extracted from each PRB pair may be limited to ECCEs which are not used as an EPDCCH candidate of aggregation level 2 in order to prevent the EPDCCH candidate of aggregation level 2 from being blocked due to transmission of an EPDCCH of aggregation level 8. In this case, although ECCEs of EPDCCH candidates of aggregation level 8 and ECCEs of the EPDCCH candidates of aggregation level 1 may overlap, ECCE overlapping may be advantageous when limited PRB pairs are used since the probability that aggregation level 1 is used is lower than the probability that aggregation level 2 is used and much lower particularly when a large number of REs, such as aggregation level 8, is used.

Figure 22:
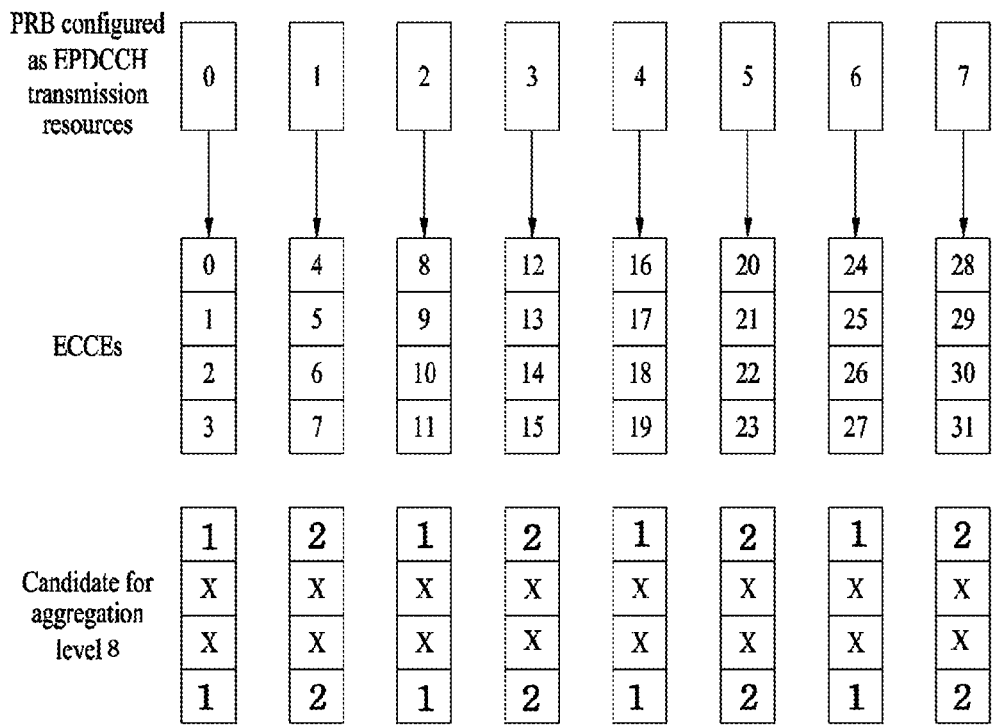
FIG. 22 illustrates an example of configuring an EPDCCH candidate of aggregation level 8 according to the fourth embodiment of the present invention.

FIG. 22 illustrates an example of configuring EPDCCH candidates of aggregation level 8 according to the fourth embodiment of the present invention. FIG. 22 assumes that two EPDCCH candidates of aggregation level 8 are set and respectively use ECCEs denoted by 1 and 2.

Additional shift on a PRB pair basis or an ECCE basis may be applied to the aforementioned exemplified EPDCCH candidates or EPDCCH search spaces according to a C-RNTI of the corresponding UE or a subframe index. Even in this case, the above-described properties may be maintained in order to maintain the relationship between EPDCCH candidates of aggregation levels. For example, when the additional shift is applied to the search space of aggregation level 1, the same shift can be applied to the search spaces of other aggregation levels such that relative positions of the search spaces of the aggregation levels are not changed.

In Expression 1 which defines the position of the PDCCH candidate and the position of the search space for the PDCCH, for example, $L \cdot Y_k$, which is obtained by multiplying variable $Y_k$ that designates shift in the search space by aggregation level L, is set as a shift value at the corresponding aggregation level. However, the same shift value $Y_k$ can be applied to all aggregation levels, except the part by which aggregation level L is multiplied, in order to maintain the aforementioned characteristic of the present invention. Alternatively, shift on a PRB pair basis may be used in order to maintain the relationship between PRB pairs. That is, when four ECCEs are formed per PRB pair, only shift values corresponding to a multiple of 4 are regarded as valid values.

While it is assumed that ECCEs are distributed in a large number of RBs to transmit an EPDCCH in the case of aggregation level 8 in the example of FIG. 22, the EPDCCH may be transmitted over two consecutive RB pairs in order to provide localized EPDCCH transmission. In this case, two PRB pairs are preferably selected from among PRB pairs other than PRB pairs used for aggregation level 2 in order to avoid collision with aggregation level 4.

Figure 23:
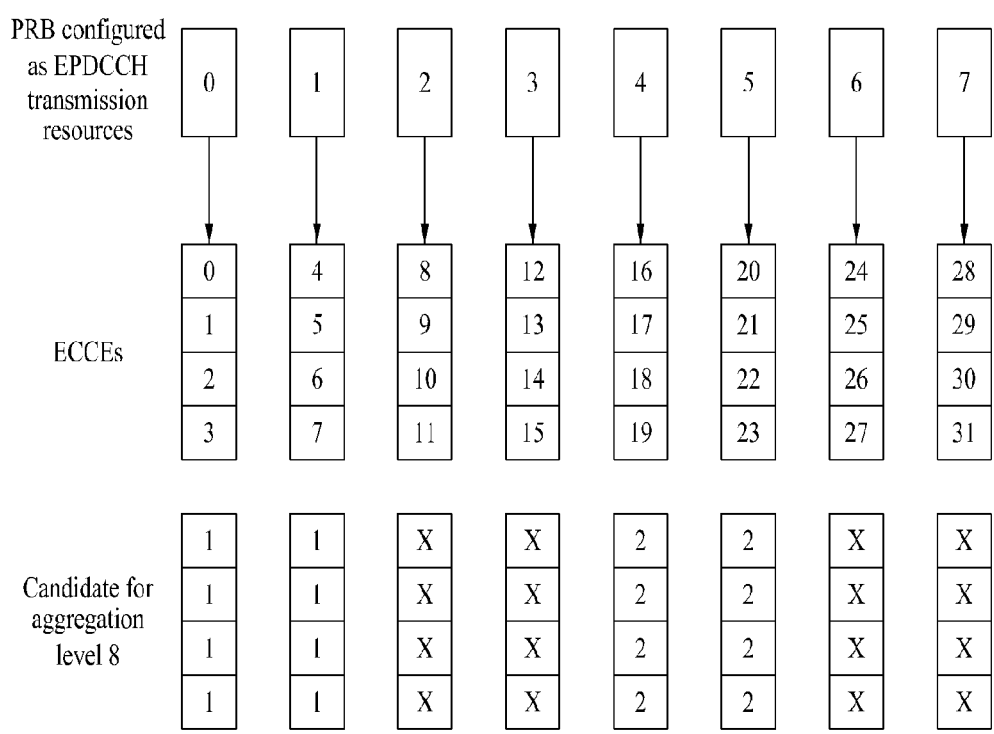
FIG. 23 illustrates another example of configuring an EPDCCH candidate of aggregation level 4 according to the fourth embodiment of the present invention.

FIG. 23 illustrates another example of configuring EPDCCH candidates of aggregation level 8 according to the fourth embodiment of the present invention. FIG. 23 assumes that the same EPDCCH candidates of aggregation level 4 as in FIG. 21 are used.

Referring to FIG. 23, one EPDCCH candidate of aggregation level 8 is configured using eight ECCEs denoted by number 1 and another EPDCCH candidate of aggregation level 8 is configured using eight ECCEs denoted by number 2. An EPDCCH candidate of aggregation level 8 may be configured by selecting two appropriate PRB pairs from PRB pairs other than RBs (i.e. PRB pair #3 and PRB pair #7) used for aggregation level 4.

Referring back to FIG. 20, EPDCCH candidates of aggregation level 1 and aggregation level 2 are separately arranged on ECCEs and thus the EPDCCH candidates do not overlap. However, only six of eight PRB pairs are used. In this case, even when the remaining two PRB pairs are in good channel state, the two PRB pairs cannot be used at the corresponding aggregation level. To solve this, the scheme illustrated in FIG. 20 needs to be modified.

Figure 24:
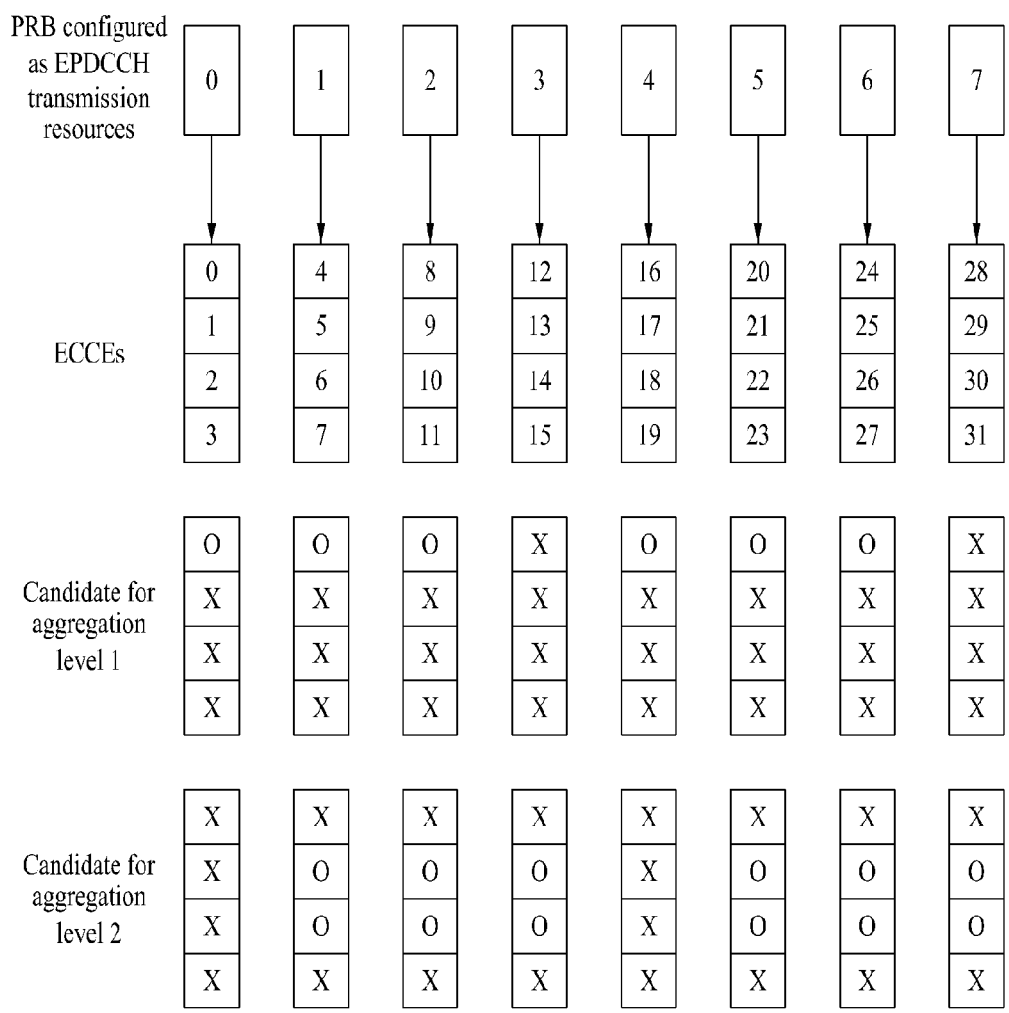
FIG. 24 illustrates another example of configuring EPDCCH candidates of aggregation level 1 and aggregation level 2 according to the fourth embodiment of the present invention.

FIG. 24 illustrates another example of configuring EPDCCH candidates of aggregation level 1 and aggregation level 2 according to the fourth embodiment of the present invention. Particularly, FIG. 24 shows a case in which PRB pairs in which EPDCCH candidates of aggregation level 2 are disposed, shown in FIG. 20, are shifted.

Referring to FIG. 24, one EPDCCH candidate of aggregation level 1 or 2 is disposed in at least one PRB pair by using PRB pairs #1, #2 and #3 instead of PRB pairs #0, #1 and #2.

In this case, it is impossible to configure an EPDCCH candidate of aggregation level 4, as illustrated in FIG. 21, that is, an EPDCCH candidate of aggregation level 4 using a PRB pair which does not include an EPDCCH candidate of aggregation level 1 or 2. Accordingly, to minimize the influence of aggregation level 4 on aggregation level 1 or 2, an EPDCCH candidate of aggregation level 4 can be configured by selecting a PRB pair other than PRB pairs (PRB pairs #1, #2, #5 and #6 in FIG. 24) in which both the EPDCCH candidates of aggregation levels 1 and 2 are present. In particular, it is more desirable to use a PRB pair which includes only an EPDCCH candidate of aggregation level 1 for an EPDCCH candidate of aggregation level 4 since the EPDCCH candidate of aggregation level 4 is used in the case of bad channel state and the possibility that the EPDCCH candidate of aggregation level 4 is used with aggregation level 1 used in the case of good channel state is low.

Figure 25:
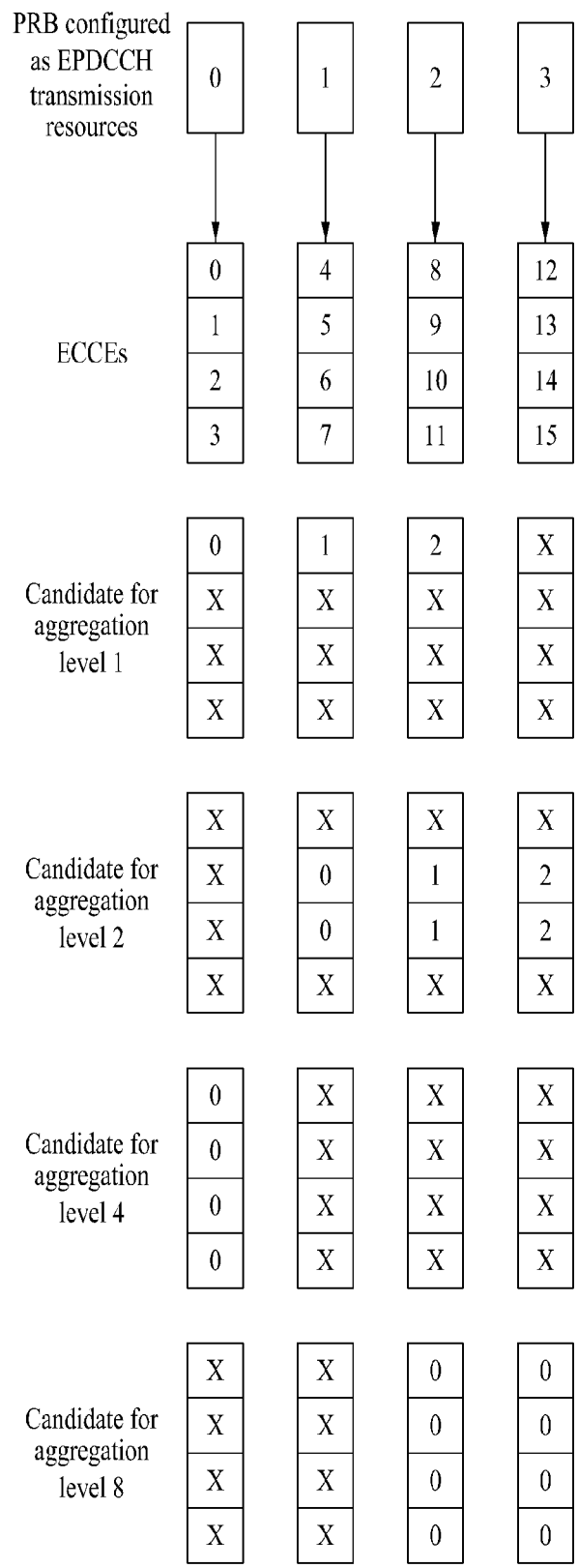
FIG. 25 illustrates another example of configuring EPDCCH candidates of aggregation level 1, aggregation level 2, aggregation level 4 and aggregation level 8 according to the fourth embodiment of the present invention.

FIG. 25 illustrates an example of configuration of EPDCCH candidates of aggregation levels 1, 2, 4 and 8 according to the fourth embodiment of the present invention. For convenience of description, FIG. 25 assumes that four PRB pairs are set, three EPDCCH candidates are configured for aggregation level 1, three EPDCCH candidates are configured for aggregation level 2, one EPDCCH candidate is configured for aggregation level 4 and one EPDCCH candidate is configured for aggregation level 8.

Referring to FIG. 25, the embodiment illustrated with reference to FIG. 24 is applied to aggregation levels 1 and 2 and PRB pair #0 which includes only the EPDCCH candidate of aggregation level 1 is used for aggregation level 4. In addition, the EPDCCH candidate of aggregation level 8 is configured using PRB pair #3 which is used for aggregation level 2 only and PRB pair #2 adjacent thereto other than the PRB pair used for aggregation level 4.

An EPDCCH for one UE may be configured based on four PRB pairs as shown in FIG. 25. When eight PRB pairs are used, as shown in FIG. 24, two basic configurations, each of which uses four PRB pairs, may be set.

The number of ECCEs which can be included in one PRB pair may depend on a specific subframe configuration. For example, when a large number of REs is used to transmit a signal (e.g. a CRS or a CSI-RS) other than the EPDCCH in a specific subframe or a DM-RS is defined only for two antenna ports as in the extended CP case, only two ECCEs can be formed per PRB pair. Alternatively, four ECCEs may be formed per PRB pair and a minimum aggregation level may be increased to 2 from 1. In this case, the minimum aggregation level can be increased to 2 from 1 by combining two ECCEs and treating the combined ECCEs as a new ECCE.

A description will be given of a method of extending the principle of the present invention and applying the extended principle to a case in which two ECCEs are formed per PRB pair.

Figure 26:
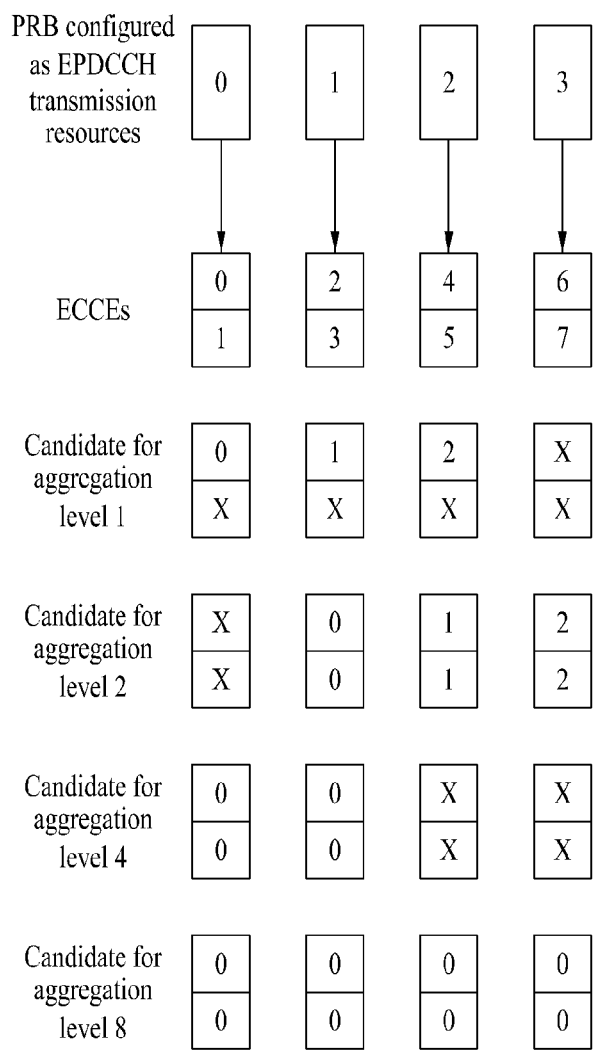
FIG. 26 illustrates an example of configuring EPDCCH candidates of aggregation level 1, aggregation level 2, aggregation level 4 and aggregation level 8 when two ECCEs are generated per PRB pair, according to the fourth embodiment of the present invention.

FIG. 26 illustrates an example of configuration of EPDCCH candidates of aggregation levels 1, 2, 4 and 8 when two ECCEs are formed per PRB pair according to the fourth embodiment of the present invention.

Referring to FIG. 26, EPDCCH candidates of aggregation level 1 and EPDCCH candidates of aggregation level 2 may be configured such that the EPDCCH candidates do not overlap in at least one PRB pair. To minimize the influence of aggregation level 4 on aggregation level 2, a PRB pair, which includes only an EPDCCH candidate of aggregation level 1, is preferentially used for an EPDCCH candidate of aggregation level 4. Positions of ECCEs corresponding to the EPDCCH candidate of aggregation level 8 are fixed since all eight ECCEs are used.

Figure 27:
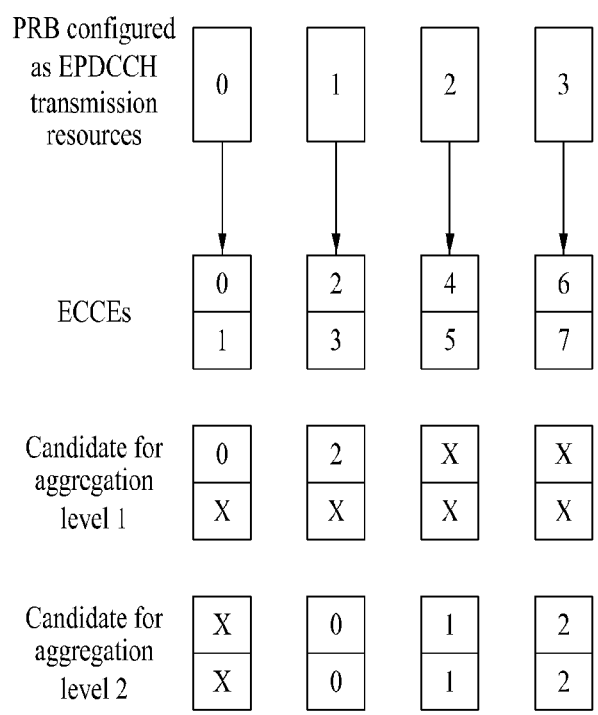
FIG. 27 illustrates an example of configuring EPDCCH candidates of aggregation level 1 and aggregation level 2 when two ECCEs are generated per PRB pair, according to the fourth embodiment of the present invention.

FIG. 27 illustrates an example of configuration of EPDCCH candidates of aggregation levels 1 and 2 when two ECCEs are formed per PRB pair according to the fourth embodiment of the present invention.

FIG. 27 shows a modification of the method shown in FIG. 26. Referring to FIG. 27, two EPDCCH candidates of aggregation level 1 are disposed in one PRB pair which is not used for aggregation level 2 in order to minimize collision of aggregation level 1 and aggregation level 2.

When only two ECCEs can be formed per PRB pair, the number of all used PRB pairs may be increased.

Figure 28:
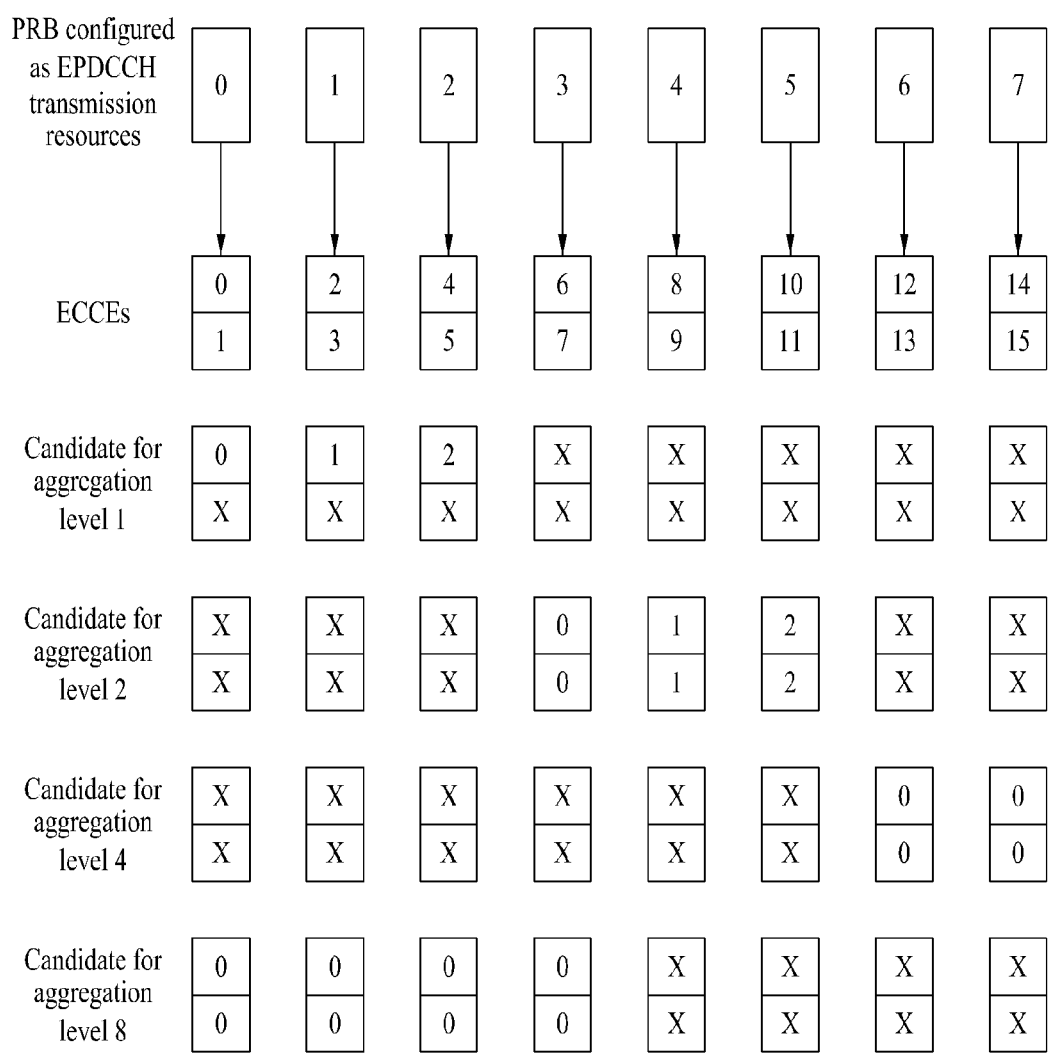
FIG. 28 illustrates another example of configuring EPDCCH candidates of aggregation level 1, aggregation level 2, aggregation level 4 and aggregation level 8 when two ECCEs are generated per PRB pair, according to the fourth embodiment of the present invention.

FIG. 28 illustrates another example of configuring EPDCCH candidates of aggregation levels 1, 2, 4 and 8 when two ECCEs are formed per PRB pair according to the fourth embodiment of the present invention. Particularly, FIG. 28 shows a case in which three EPDCCH candidates are configured for aggregation level 1, three EPDCCH candidates are configured for aggregation level 2, one EPDCCH candidate is configured for aggregation level 4 and one EPDCCH candidate is configured for aggregation level 8, using eight PRB pairs.

Referring to FIG. 28, PRB pairs used for the EPDCCH candidates of aggregation level 1 are separated from PRB pairs used for the EPDCCH candidates of aggregation level 2 such that the PRB pairs for aggregation level 1 and the PRB pairs for aggregation level 2 do not overlap, and the EPDCCH candidate of aggregation level 4 is configured using PRB pairs #6 and #7 which are not used for aggregation levels 1 and 2. In addition, the EPDCCH candidate of aggregation level 8 is configured by preferentially using the PRB pairs used for the EPDCCH candidates of aggregation level 1 while avoiding the PRB pairs used for the EPDCCH candidate of aggregation level 4.

Figure 29:
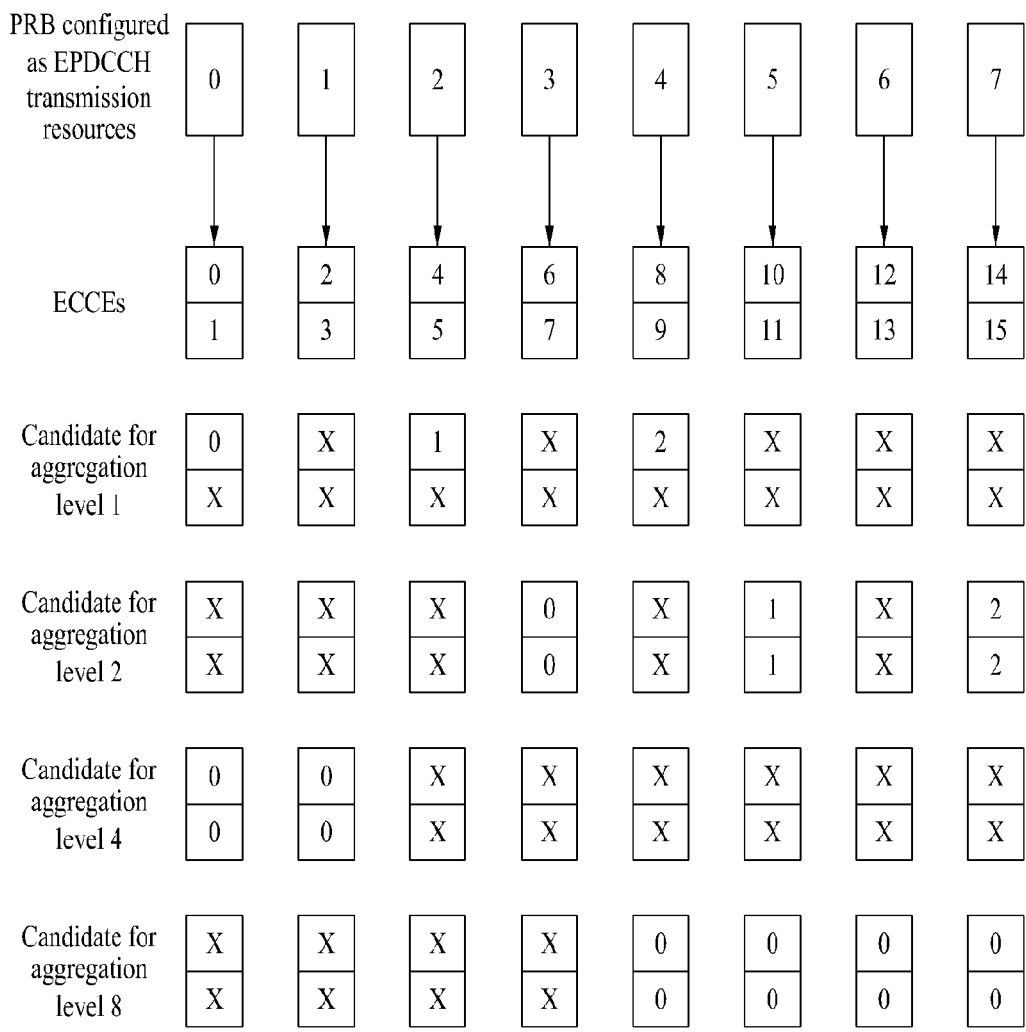
FIG. 29 illustrates another example of configuring EPDCCH candidates of aggregation level 1, aggregation level 2, aggregation level 4 and aggregation level 8 when two ECCEs are generated per PRB pair, according to the fourth embodiment of the present invention.

FIG. 29 illustrates another example of configuring EPDCCH candidates of aggregation levels 1, 2, 4 and 8 when two ECCEs are formed per PRB pair according to the fourth embodiment of the present invention.

Referring to FIG. 29, EPDCCH candidates of aggregation levels 1 and 2 are uniformly distributed in eight PRB pairs. Since the ECCEs used for aggregation level 2 are still disposed in the same PRB pairs even when 1 is added to the indexes of the ECCEs in the structure of FIG. 25, the example of FIG. 29 has an ECCE configuration very similar to the configuration shown in FIG. 25, in which four ECCEs are formed per PRB pair, and ECCE indexes correspond to EPDCCH candidates in the ECCE configuration. Accordingly, the range of the search space can be maintained even when the number of ECCEs configured per PRB pair is varied.

The principle of determining positions of EPDCCH candidates, described in the fourth embodiment of the present invention, for example, the principle of locating EPDCCH candidates of aggregation levels 1 and 2 in separated positions such that ECCEs corresponding to the EPDCCH candidates of aggregation levels 1 and 2 do not overlap, as described with reference to FIG. 20, or the principle of locating an EPDCCH candidate of aggregation level 4 in a PRB pair in which a low aggregation level EPDCCH candidate is not disposed, as described with reference to FIG. 21, can also be applied to a case in which the number of EPDCCH candidates is different from those assumed in the aforementioned embodiments.

In addition, the positions of the EPDCCH candidates, described in the fourth embodiment of the present invention, can be applied to distributed EPDCCH transmission in which one ECCE is transmitted over a plurality of PRB pairs, for common search space configuration.

Figure 30:
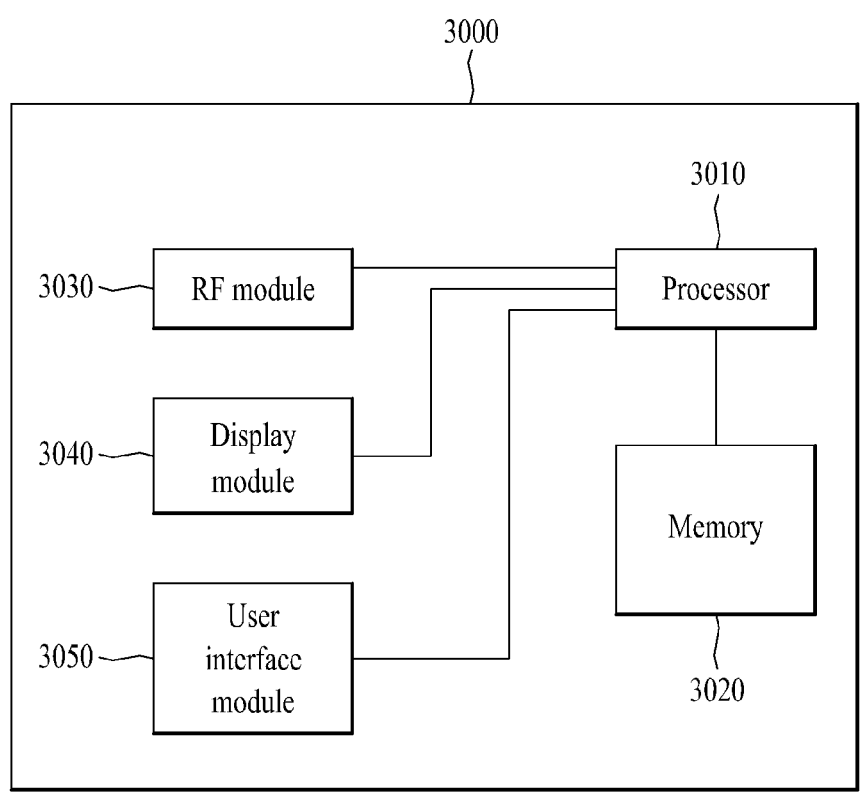
FIG. 30 is a block diagram of a communication apparatus according to an embodiment of the present invention.

FIG. 30 is a block diagram for an example of a communication device according to one embodiment of the present invention.

Referring to FIG. 30, a communication device 3000 may include a processor 3010, a memory 3020, an RF module 3030, a display module 3040, and a user interface module 3050.

Since the communication device 3000 is depicted for clarity of description, prescribed module(s) may be omitted in part. The communication device 3000 may further include necessary module(s). And, a prescribed module of the communication device 3000 may be divided into subdivided modules. A processor 3010 is configured to perform an operation according to the embodiments of the present invention illustrated with reference to drawings. In particular, the detailed operation of the processor 3010 may refer to the former contents described with reference to FIG. 1 to FIG. 29.

The memory 3020 is connected with the processor 3010 and stores an operating system, applications, program codes, data, and the like. The RF module 3030 is connected with the processor 3010 and then performs a function of converting a baseband signal to a radio signal or a function of converting a radio signal to a baseband signal. To this end, the RF module 3030 performs an analog conversion, amplification, a filtering, and a frequency up conversion, or performs processes inverse to the former processes. The display module 3040 is connected with the processor 3010 and displays various kinds of informations. And, the display module 3040 can be implemented using such a well-known component as an LCD (liquid crystal display), an LED (light emitting diode), an OLED (organic light emitting diode) display and the like, by which the present invention may be non-limited. The user interface module 3050 is connected with the processor 3010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the method for transmitting and receiving a downlink control channel in a wireless communication system and the apparatus therefor have been described in the context of a 3GPP LTE system, the present invention is also applicable to many other wireless communication systems.

The invention claimed is:

1. A method for receiving, by a user equipment (UE), a downlink signal from an evolved Node B (eNB) in a wireless communication system, the method comprising:
   receiving an enhanced physical downlink control channel (EPDCCH) for the UE from the eNB;
   determining at least one physical resource block (PRB) pair for reception of a physical downlink shared channel (PDSCH), among a plurality of PRB pairs in a resource block group (RBG) allocated to the UE,
   wherein the at least one PRB pair is determined according to a size of the RBG; and
   receiving the PDSCH based on the EPDCCH through the determined at least one PRB pair.

2. The method according to claim 1, wherein if the size of the RBG is less than a threshold value, the at least one PRB pair determined as PRB pairs included in the RBG except for a PRB pair where the EPDCCH is detected, and
   wherein if the size of the RBG is greater than or equal to the threshold value, the at least one PRB pair is determined as PRB pairs included in the RBG except for at least one PRB pair where the EPDCCH can be received.

3. The method according to claim 2, wherein if the size of the RBG is greater than or equal to the threshold value, the at least one PRB pair is determined by further excluding at least one PRB pair where another EPDCCH for another UE can be received.

4. The method according to claim 3, further comprising receiving information on the at least one PRB pair where the another EPDCCH can be received, from the eNB through a higher layer.

5. The method according to claim 4, further comprising:
   receiving information on a PRB pair where the another EPDCCH is actually transmitted from among the at least one PRB pair where the another EPDCCH can be received, from the eNB through a physical layer.

6. The method according to claim 1, wherein the size of the RBG is an effective size of the RBG, and the effective size of the RBG is determined based on a number of available resource elements for the EPDCCH in the RBG.

7. The method according to claim 1, wherein the size of the RBG is an effective size of the RBG, and the effective size of the RBG is a number of PRB pairs in the RBG.

8. A user equipment (UE) in a wireless communication system, the UE comprising:
   a radio communication module configured to transmit signals in an evolved Node B (eNB) and receive signals from the eNB; and
   a processor configured to:
   process the signals,
   when an enhanced physical downlink control channel (EPDDCH) for the UE is received from the eNB, the processor is configured to select one of a first EPDCCH determine at least one physical resource block (PRB) pair for reception of a physical downlink shared channel (PDSCH), among a plurality of PRB pairs in a resource block group (RBG) allocated to the UE,
   wherein the at least one PRB pair is determined according to a size of the RBG, and
   control the radio communication module to receive the PDSCH based on the EPDCCH through the determined at least one PRB pair.

9. The UE according to claim 8, wherein if the size of the RBG is less than a threshold value, the at least one PRB pair is determined as PRB pairs included in the RBG except for a PRB pair where the EPDCCH is detected, and
   wherein if the size of the RBG is greater than or equal to the threshold value, the at least one PRB pair is determined as PRB pairs included in the RBG except for at least one PRB pair where the EPDCCH can be received.

10. The UE according to claim 9, wherein if the size of the RBG is greater than or equal to the threshold value, the at least one PRB pair is determined by further excluding at least one PRB pair where another EPDCCH for another UE can be received.

11. The UE according to claim 10, wherein the radio communication module receives, from the eNB, a higher layer signal including information on the at least one PRB pair where the another EPDCCH can be received.

12. The UE according to claim 11, wherein the radio communication module receives, from the eNB, a physical layer signal including information on a PRB pair where the another EPDCCH is actually transmitted from among the at least one PRB pair where the another EPDCCH can be received.

13. The UE according to claim 8, wherein the size of the RBG is an effective size of the RBG, and the effective size of the RBG is determined based on a number of available resource elements for the EPDCCH in the RBG.

14. The UE apparatus according to claim 8, wherein the size of the RBG is an effective size of the RBG, and the effective size of the RBG is a number of PRB pairs in the RBG.

\* \* \* \* \*